(12) United States Patent
Russell et al.

(10) Patent No.: US 8,538,697 B2
(45) Date of Patent: Sep. 17, 2013

(54) CORE SAMPLE PREPARATION, ANALYSIS, AND VIRTUAL PRESENTATION

(76) Inventors: Mark C. Russell, Spokane, WA (US); Dominic S. I. Lindauer, Austin, TX (US)

(*) Notice: Subject to any disclaimer, the term of this patent is extended or adjusted under 35 U.S.C. 154(b) by 363 days.

(21) Appl. No.: 12/817,503

(22) Filed: Jun. 17, 2010

(65) Prior Publication Data

US 2010/0324868 A1 Dec. 23, 2010

Related U.S. Application Data

(60) Provisional application No. 61/219,278, filed on Jun. 22, 2009.

(51) Int. Cl.
*G01N 1/00* (2006.01)
*E21B 3/00* (2006.01)
*E21B 49/00* (2006.01)

(52) U.S. Cl.
USPC ......... 702/6; 73/152.07; 166/250.01; 83/177; 175/58

(58) Field of Classification Search
USPC ............... 702/6; 73/152.07, 152.09; 83/53, 83/117, 177; 175/58
See application file for complete search history.

(56) References Cited

U.S. PATENT DOCUMENTS

| | | | |
|---|---|---|---|
| 3,857,516 A * | 12/1974 | Taylor et al. | 239/752 |
| 3,960,407 A * | 6/1976 | Noren | 299/17 |
| 4,852,182 A | 7/1989 | Herbin et al. | |
| 4,911,002 A * | 3/1990 | Enderlin et al. | 73/152.11 |
| 5,980,372 A | 11/1999 | Spishak | |
| 6,347,675 B1 * | 2/2002 | Kolle | 175/69 |
| 8,234,912 B2 * | 8/2012 | Suarez-Rivera et al. | 73/81 |
| 2007/0180932 A1 | 8/2007 | Wilson | |
| 2008/0093125 A1 * | 4/2008 | Potter et al. | 175/67 |
| 2008/0166958 A1 | 7/2008 | Golden et al. | |
| 2009/0078467 A1 | 3/2009 | Castillo | |
| 2009/0227185 A1 * | 9/2009 | Summers et al. | 451/39 |

OTHER PUBLICATIONS

American Petroleum Institute, "Recommended Practices for Core Analysis", Second Edition, Feb. 1998 http://w3.energistics.org/RP40/rp40.pdf.*

* cited by examiner

*Primary Examiner* — Sujoy Kundu
*Assistant Examiner* — Regis Betsch
(74) *Attorney, Agent, or Firm* — Lindauer Law, PLLC; Dominic S. I. Lindauer

(57) ABSTRACT

Core samples may be easily, quickly, and safely split using a fluid cutter, such as a water jet. Cutting may take place upon exit of the sample from the drill tube, or core samples may be placed in core carriers for cutting. Core samples may also be stored and transported in the core carriers. Assessment of core samples is facilitated by scanning the core samples, with the results stored to produce a virtual core sample. Virtual core samples may be displayed on a computing device, including a core sample display device which simulates the appearance of a section of an actual core.

20 Claims, 21 Drawing Sheets

CORE SAMPLE PREPARATION, ANALYSIS, AND VIRTUAL PRESENTATION

PRIORITY

The present application claims priority to U.S. Provisional Application Ser. No. 61/219,278, filed on Jun. 22, 2009, entitled "Core sample preparation, analysis, and virtual presentation." This pending application is herein incorporated by reference in its entirety, and the benefit of the filing date of this pending application is claimed to the fullest extent permitted.

BACKGROUND

Geologists work to understand the composition and distribution of materials in the earth. One way in which geologists gather data is by drilling and obtaining core samples of material taken from the drill hole. The geologist examines the material in the core samples to determine subsurface features, material compositions, and so forth. In some instances cores of man-made features, such as dams, bridges, and so forth are also taken. Such cores provide information useful to engineers to determine various parameters about the feature.

Core samples, or "cores," are generally cylindrical pieces of material extracted from a corer or similar device. While information is obtainable by examining the outer surface of the core sample, examination of the interior of the sample provides additional details and greater information. However, accessing the interior of the core sample has proven problematic given the typical hardness of the cored material, weight of the core, and so forth.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
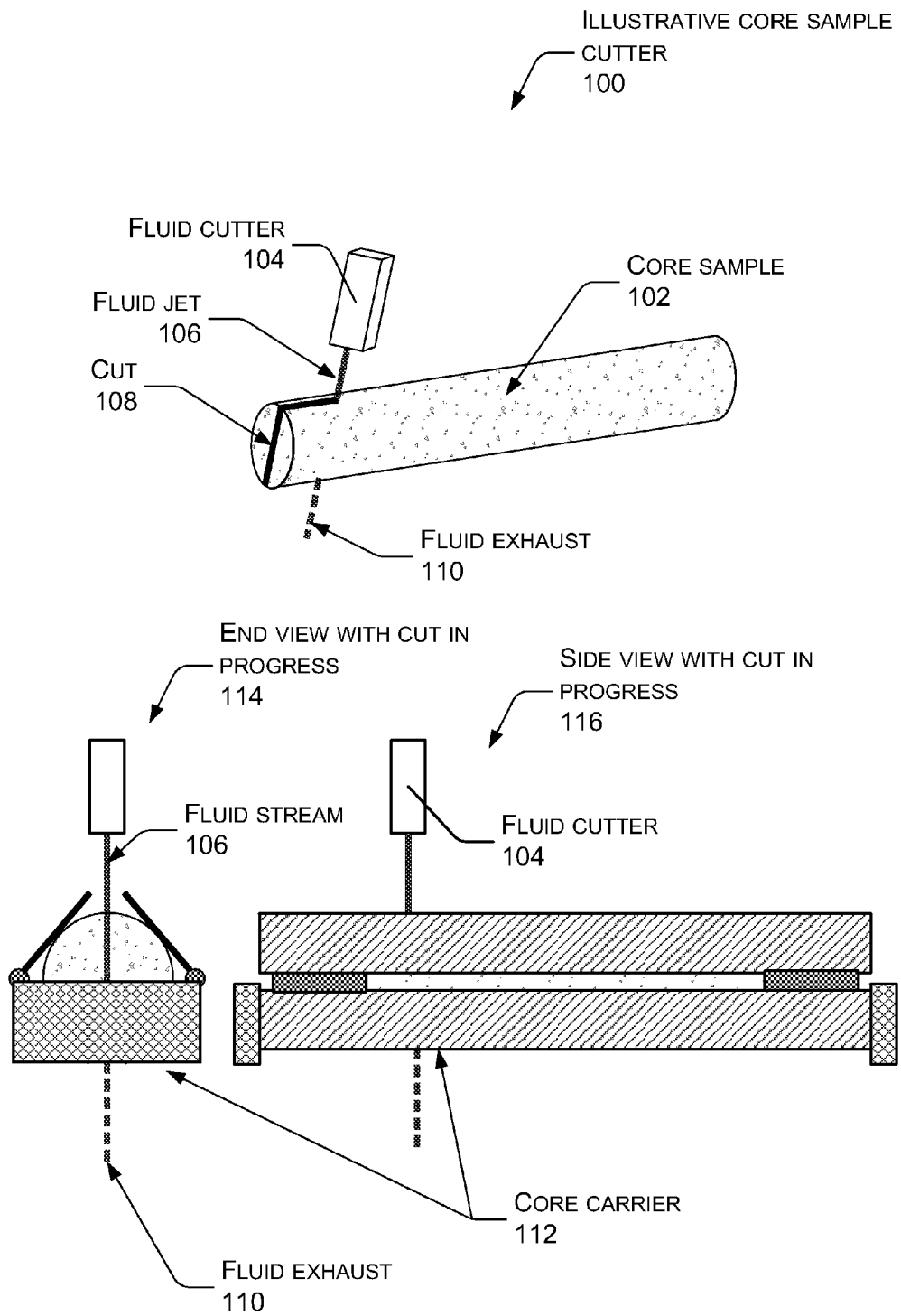
FIG. 1 illustrates a core sample cutter using a fluid cutter and a core carrier to hold at least a portion of the core sample during cutting.

Core samples provide a useful way to characterize materials such as rock, compact clays, concrete, and so forth. To enhance the quality of information obtained from a core sample, the core sample may be split to allow access to the interior. Such splitting poses problems in handling due to weight, length, and so forth of the core sample. Furthermore, in some applications it is important to maintain the linear continuity, orientation, or both of the core samples so that a location, directionality, and so forth of a feature of interest within the core may be accurately determined.

One traditional core splitting method involves the use of a mechanical splitter which uses an edge under pressure to break the sample lengthwise. However, these mechanical splitters are dangerous to operate due to the forces required, possibility of flying debris and so forth. Furthermore, mechanical splitters are slow, requiring small sections of a core sample to be removed from a carrier box, split in one or more operations, and returned to the carrier box. This also increases the risk of misaligning or misordering samples.

Another traditional method of core splitting involves the use of diamond saws. Saw splitting offers the advantage of providing a clean cut, but suffers from serious drawbacks. These including contamination of the core sample, slow cutting time, and high cost. For example, contamination occurs because the cutting action of the diamond saw drives the diamond abrasives and other contaminant materials into the sample. As a result, characterization of the core sample is less accurate. Additionally, the cutting process of cutting a core with a diamond saw is also slow. Also, not all sections of core may be cut with the diamond saw. For example, small pieces, fragile pieces, and friable pieces of core are not candidates for diamond cutting.

Furthermore, diamond cutting blades are expensive. When one considers that a core sample may be several hundred or thousand feet in total length, the number of expensive blades becomes prohibitive.

This disclosure is directed towards devices, methods, and systems for cutting, handling, and characterizing core samples. In one implementation, a core sample placed within a core carrier is cut using a fluid cutter. This results in rapid, clean, accurate, and safe cutting of the cores. The core carrier is configured to allow for the entrance of the fluid jet and the exit of fluid exhaust, while containing the core sample. In another implementation, a core sample may be cut while exiting the core tube while also being scanned by instrumentation.

Core samples may also be marked with indicia to provide positive identification of each core sample 102 section. The indicia may also reference the core sample's position, orientation, or both relative to one another or absolutely with regard to the original depth or position of the core sample.

Instrumentation such as cameras, radiation sensors, x-ray fluorescence scanners, and so forth may scan core samples before, after, or both before and after cutting and store this data. A user may access this data for analysis. In one implementation, the data is accessible via a user interface presented on a computing device. When available via a computer network, or a transportable computer readable storage medium, a user such as a geologist or engineer may be able to view and characterize, or log, a core sample from anywhere.

Additionally, at least a portion of the data collected may be presented to the user via a core sample display device (CSDD). The core sample display device provides an interactive interface between the user and the data about of the core sample. Configured to exhibit a form factor similar to that of an actual core sample, the CSDD displays data collected during scan of core samples, and provide a virtual core representation to a user.

The CSDD incorporates a display to present a visual representation of the core. The display may also incorporate a touch sensor, allowing a user to manipulate the data presented by touch. User interface controls may be physical controls (buttons, joystick, touchpad, etc), virtual controls (such as touchscreen), or "soft" controls using display to show function/label and physical button to accept input. The user may manipulate the virtual core by using input buttons, through motion, orientation, and so forth. For example, the user may be holding tube approximately horizontal, and wish to view change to view a different section of core. By tipping the core sample display device, the core sample may appear to "slide" in response to the tipping. When the desired section is reached, restoring the CSDD to a level orientation stops the slide. Shaking the unit may to explode the image out, separating layers for a view at the center of the core. Other functions may be assigned to these or other inputs.

Illustrative Core Sample Cutter and Carrier

FIG. 1 illustrates a core sample cutter 100 using a fluid cutter and a core carrier to hold at least a portion of the core sample. In this illustration a portion of a core sample 102 is shown. A fluid cutter 104 is positioned to direct a fluid jet 106 at the core sample 102. The fluid cutter 104 may incorporate several mechanisms, as described below with regards to FIG. 12. In one implementation the fluid jet 106 may comprise a water jet under high pressures exceeding 30,000 pounds per square inch.

Under the force of the fluid jet 106, a cut 108 is produced in the core sample 102. Depending upon the relative speed of the fluid cutter 104 and fluid jet 106 with respect to the core sample 102 (i.e., feed rate), various surface finishes in the cut may be obtained. For example, faster feed rates cut more quickly and impart a rippled surface on the core sample 102. This rougher surface is advantageous in some implementations, by providing a surface for analysis which does not have a high reflective index associated with techniques such as diamond saw cutting.

Fluid exhaust 110 exits the core sample 102, carrying with it material which was removed from the cut 108. By using the fluid cutter 104, a clean, rapid cut is achieved with relatively low cost and greatly minimizing potential for injury to an operator. As a result, core samples are more quickly processed and ready for analysis, reducing delays and overall cost.

During cutting, the core sample 102 may be contained by a core carrier 112. The core carrier 112 may be constructed of materials including wood, plastic, metal, ceramic, composite, or a combination. As shown in an end view 114 and a side view 116, when a cut is in progress the fluid jet 106 cuts the core sample 102 without impinging upon the core carrier 112. As a result, the core carrier 112 remains intact and able to contain the core sample 102.

Figure 2:
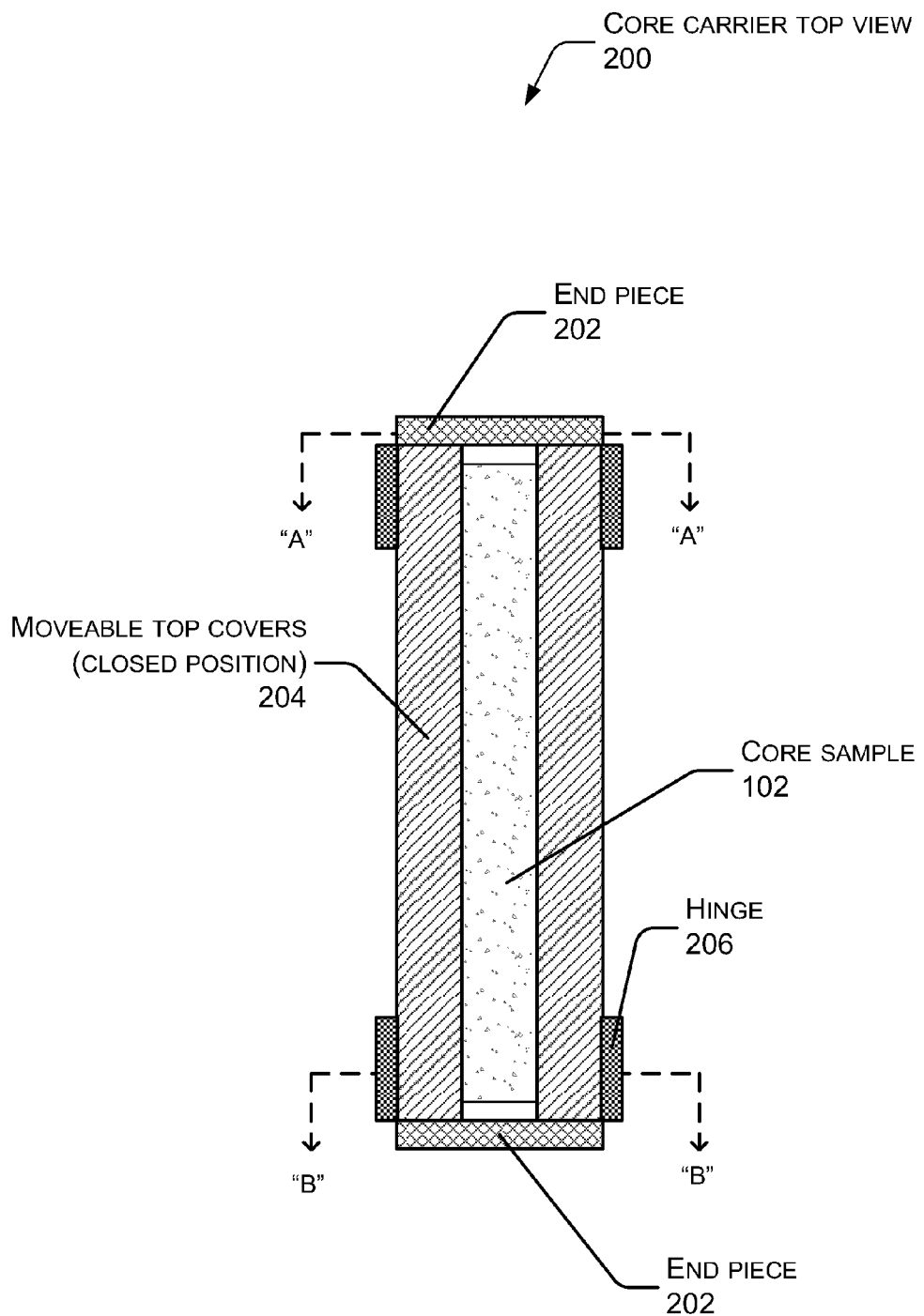
FIG. 2 illustrates a top view of the core carrier of FIG. 1.

FIG. 2 illustrates a top view 200 of the core carrier 112 of FIG. 1. In this top view 200, the core sample 102 is shown disposed between two end pieces 202 and below two moveable top covers in a closed position 204. The moveable top covers are coupled to the body of the core carrier 112 via one or more hinges 206. In some implementations the top covers may sit atop or be mechanically engaged such as with clamps, clips, clasps, latches, magnets, and so forth to the body of the core carrier 112.

Figure 3:
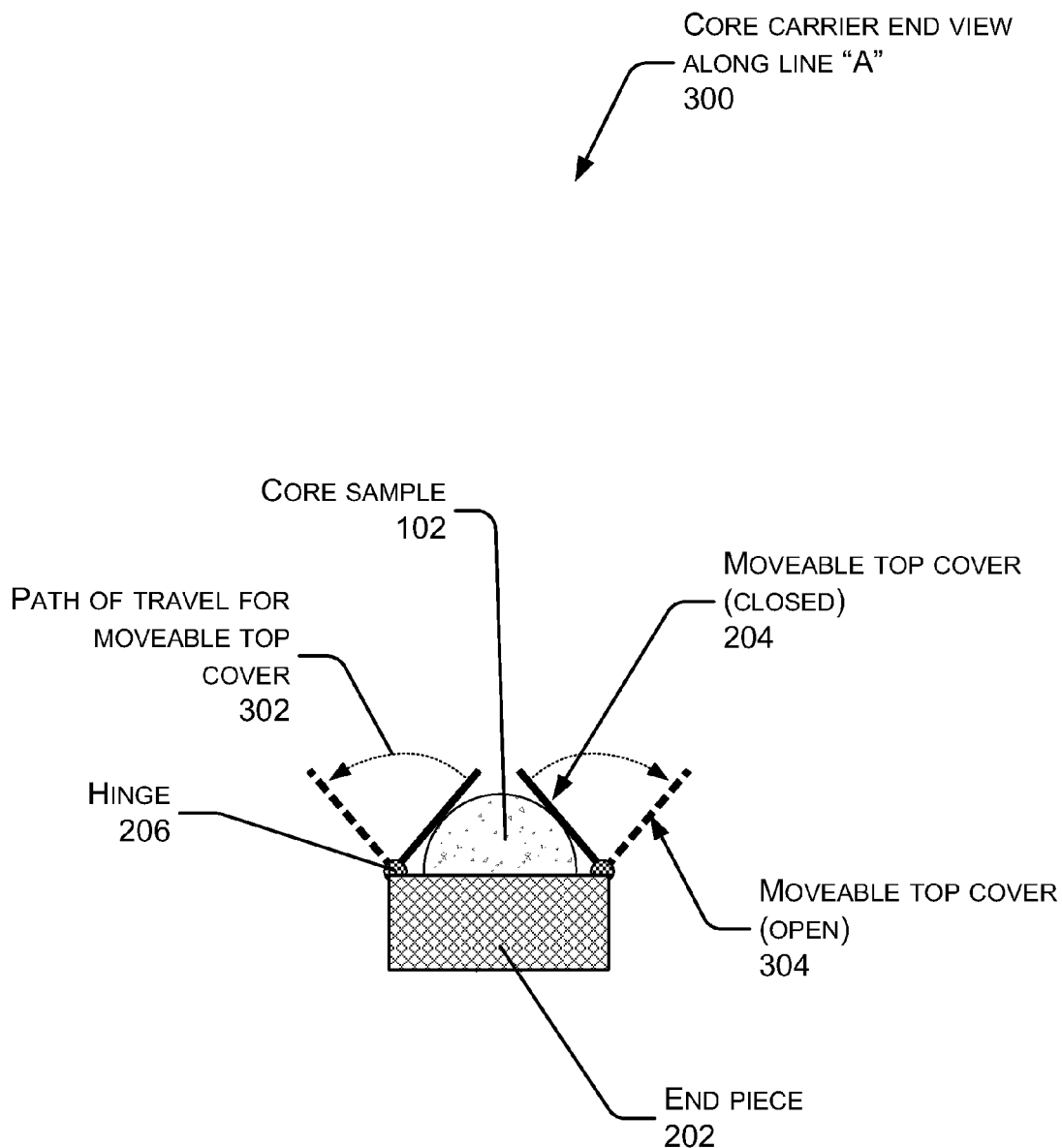
FIG. 3 illustrates an end view along line "A" of the core carrier of FIG. 1.

FIG. 3 illustrates an end view 300 of the core carrier 112 along line "A" as shown in FIG. 2. In this view, the end piece 202 is visible, as are hinges 206 which couple the top covers to the sides of the core carrier 112. As shown here, the moveable top covers are configured to pivot about the hinges 206. When moved about this pivot, a path of travel for the moveable top cover 302 is described. When the moveable top cover is in an open position 304, the core sample 112 is accessible.

Figure 4:
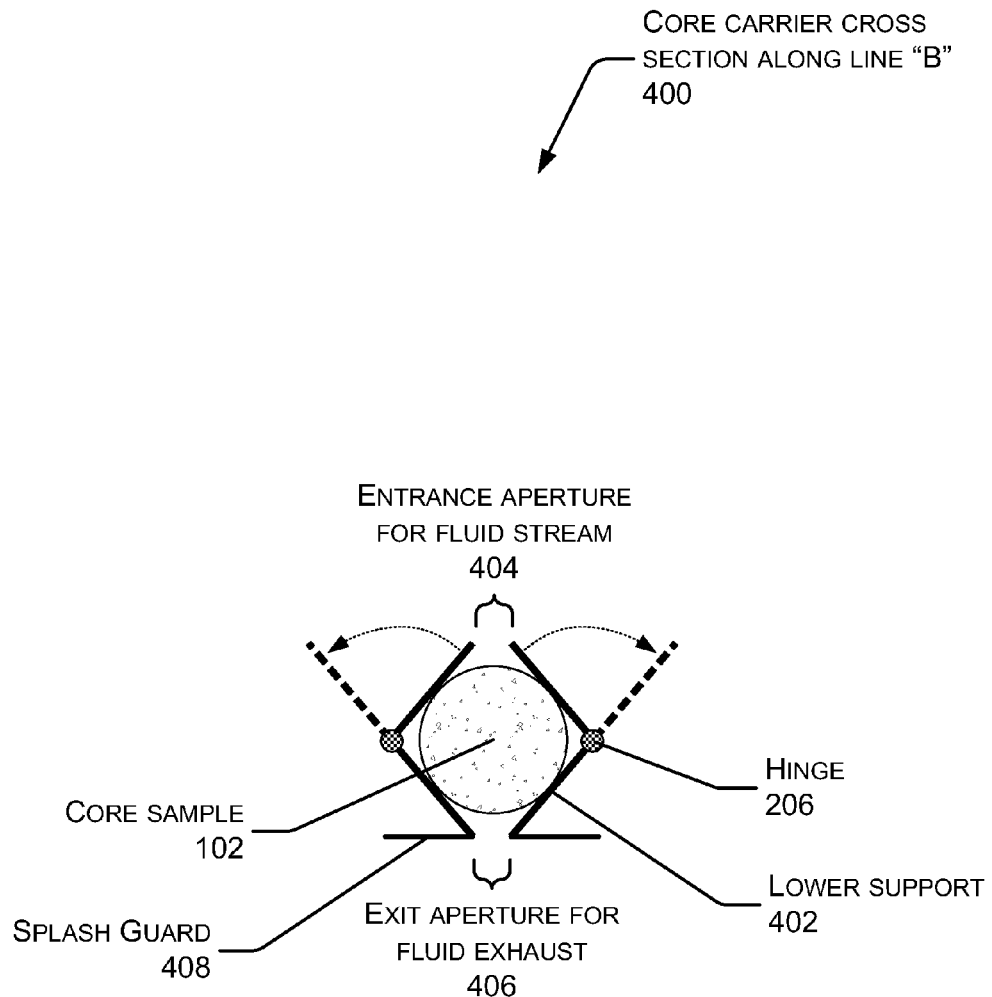
FIG. 4 illustrates an end view along line "B" of the core carrier of FIG. 1.

FIG. 4 illustrates a cross section view 400 of the core carrier 112 along line "B" as shown in FIG. 2. In this view, the core sample 102 is shown with the moveable top covers in the closed position 204. The core sample 102 rests upon lower supports 402. The lower supports 402 and the moveable top covers in the closed position 204 engage the core sample 102. Such engagement prevents the core sample 102 from shifting or rotating during cutting. The surfaces of the core carrier 112 which engage the core sample 102 may be provided with a texture or coating to improve engagement with the core sample therein.

While the lower supports 402 and the moveable covers are shown as substantially planar and arranged in a "V" shape relative to one another, in some implementations one or both of these sets of surfaces have different profiles. For example, one profile may comprise curved lower supports.

When the moveable top covers are in the closed position 204, an entrance aperture 404 for the fluid jet 106 is defined. Likewise, an exit aperture 406 for fluid exhaust 110 is provided in the bottom portion of the core carrier 112. Also shown is a splash guard 408 arranged such that each side of the splash guard extends away from the exit aperture for fluid exhaust 406 in a generally horizontal plane. The splash guard 408 is configured to, among other reasons, prevent or minimize wet particulate splashback onto the core sample 102.

Figure 5:
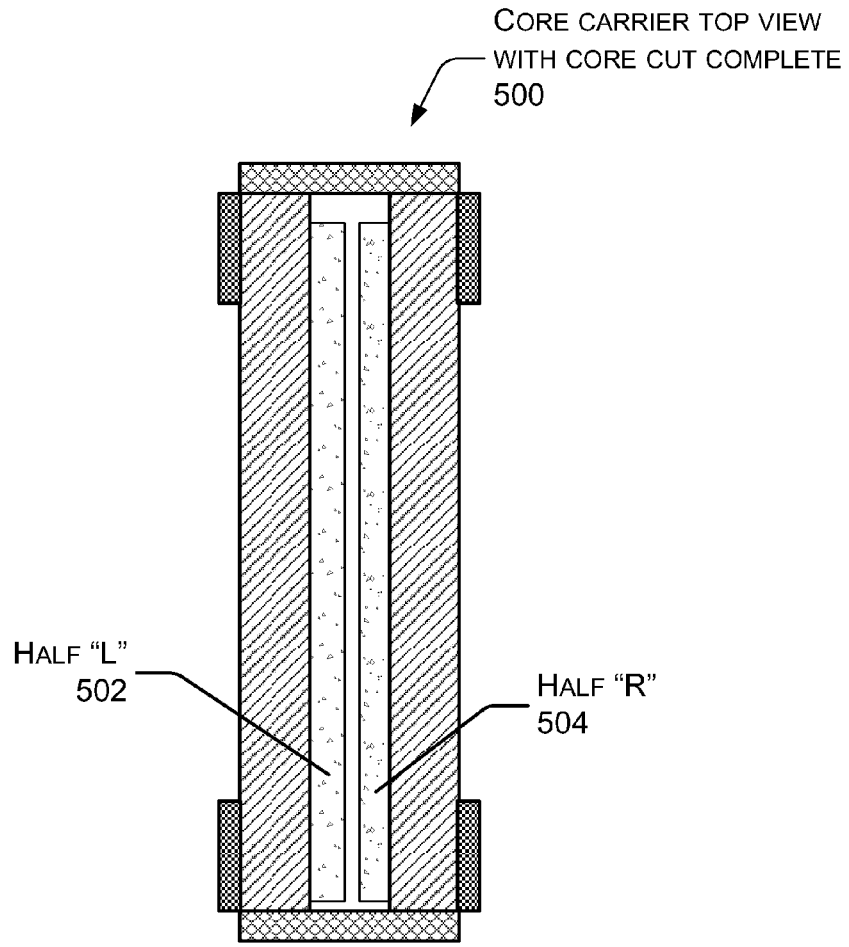
FIGS. 5 and 6 illustrate the core carrier of FIG. 1 holding a core sample cut by a fluid cutter.
Figure 6:
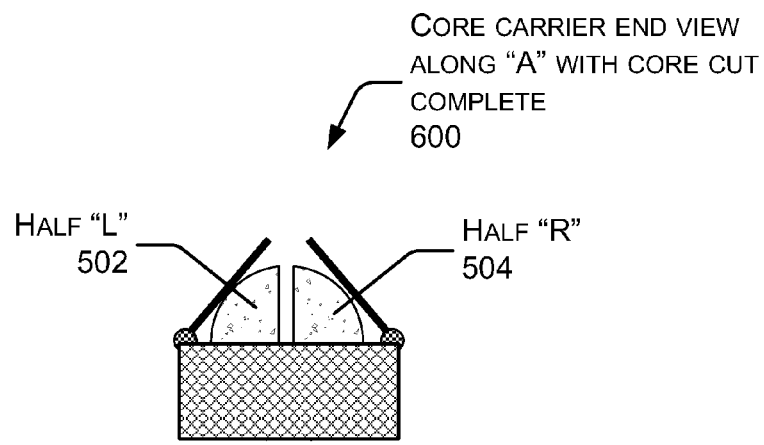

FIG. 5 illustrates the core carrier 112 holding a core sample 102 which has been split by the fluid cutter 104. The two pieces, a half "L" 502 and a half "R" 504 are shown still contained within the core carrier 112. FIG. 6 illustrates an end view 600 of the core carrier 112 along line "A" as shown in FIG. 2 and showing the two pieces. While this disclosure discusses splitting the core sample into two pieces, in some implementations the core may be split into three or more pieces.

Illustrative Multiple Core Carrier

Figure 7:
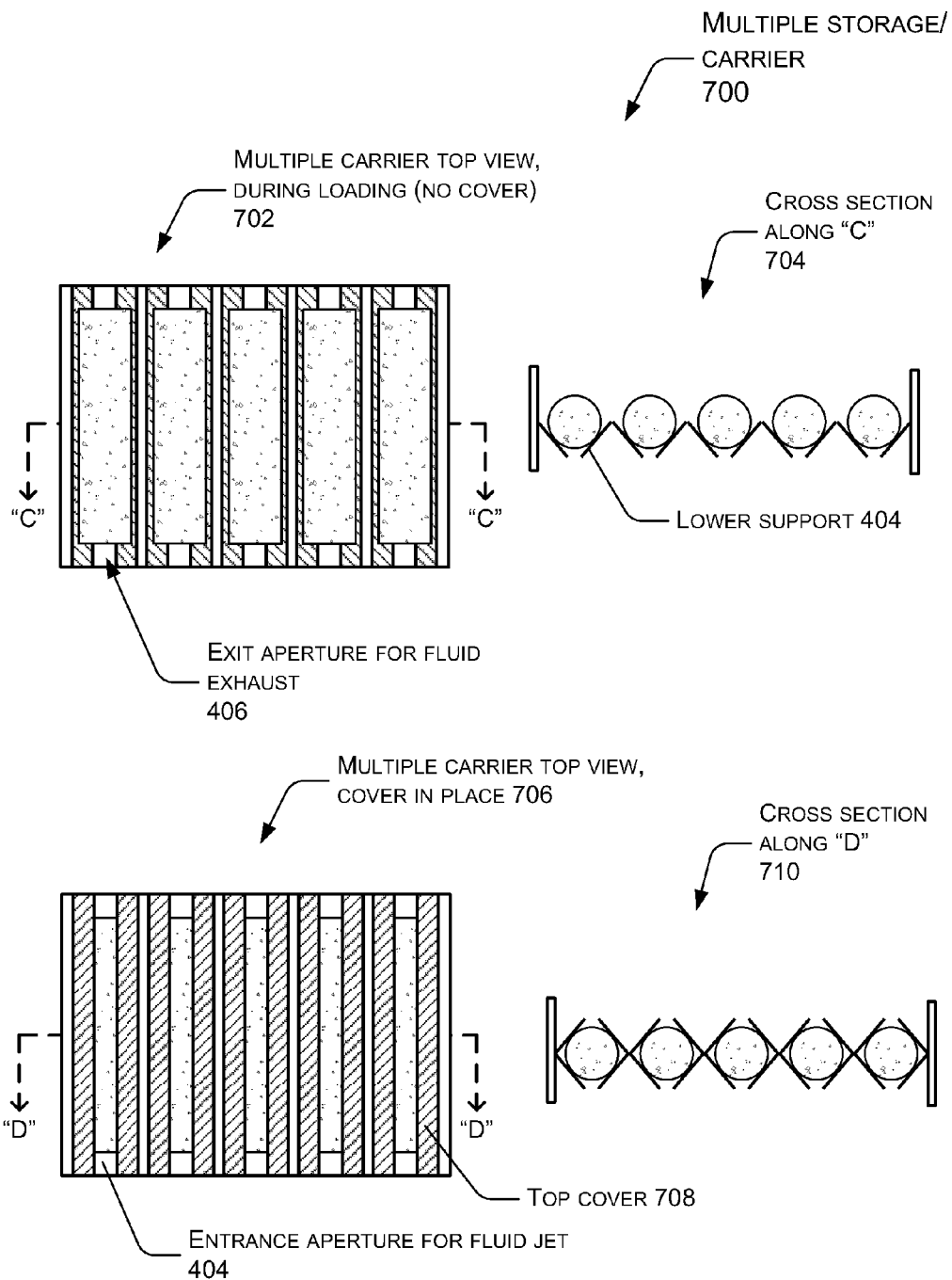
FIG. 7 illustrates a multiple core carrier configured for fluid jet cutting.

FIG. 7 illustrates a multiple core carrier 700 configured for fluid jet cutting. A series of the core samples 102 are placed from drill tube into this multiple core carrier 700. The multiple core carrier 700 may function as a fixture used for cutting the cores, to store the cores for future access, to aid in transport and handling of the cores, or a combination thereof.

As shown in a top view 702, the multiple core carrier 700 includes a plurality of locations to contain individual core samples 102. In this illustration, a base of a multiple carrier capable of holding five core samples 102 is shown during loading. The base is configured with exit apertures for fluid exhaust 406 for each core sample 102. As shown in a cross section 704 along line "C", the core samples 102 rest upon the lower supports 404.

A view 706 shows the top cover 708 in place. The top cover 708 is configured with entrance apertures for the fluid jet 404 to permit cutting of the core samples 102. As described above, this top cover may rest atop the multiple carrier base, or engage the base. A cross section 710 along line "D," depicts the top cover 708 atop the core samples 102.

Once placed in multiple core carrier 700, the core samples 102 may be cut with the fluid cutter 104. In one configuration, the fluid cutter 104 may comprise a single cutting head, allowing for serial cutting operation. In this configuration relative motion between the fluid cutter 104 and the multiple core carrier 700, and the core samples 102 within, results in the cutting of each core sample 102 individually. In another configuration, multiple fluid cutters 104 may provide for a multiple cutting head and parallel cutting operation. This multiple cutting head would thus allow cutting of several or all core samples within a single core carrier contemporaneously. In some configurations, a combination of serial and parallel cutting may be used.

When using the multiple core carrier 700 for cutting and storage, the number of occasions on which core samples 102 are handled is reduced, minimizing opportunities for confusion and mishandling. As a result, accuracy during analysis of the core samples is improved.

Illustrative Processes

FIGS. 8-12, 16, 17, and 19 illustrate example processes that may be implemented by the architectures described above with respect to FIGS. 1-7, 13-15, 18, and 20-22 or by other architectures. These processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

Fluid Cutting of Core Samples

Figure 8:
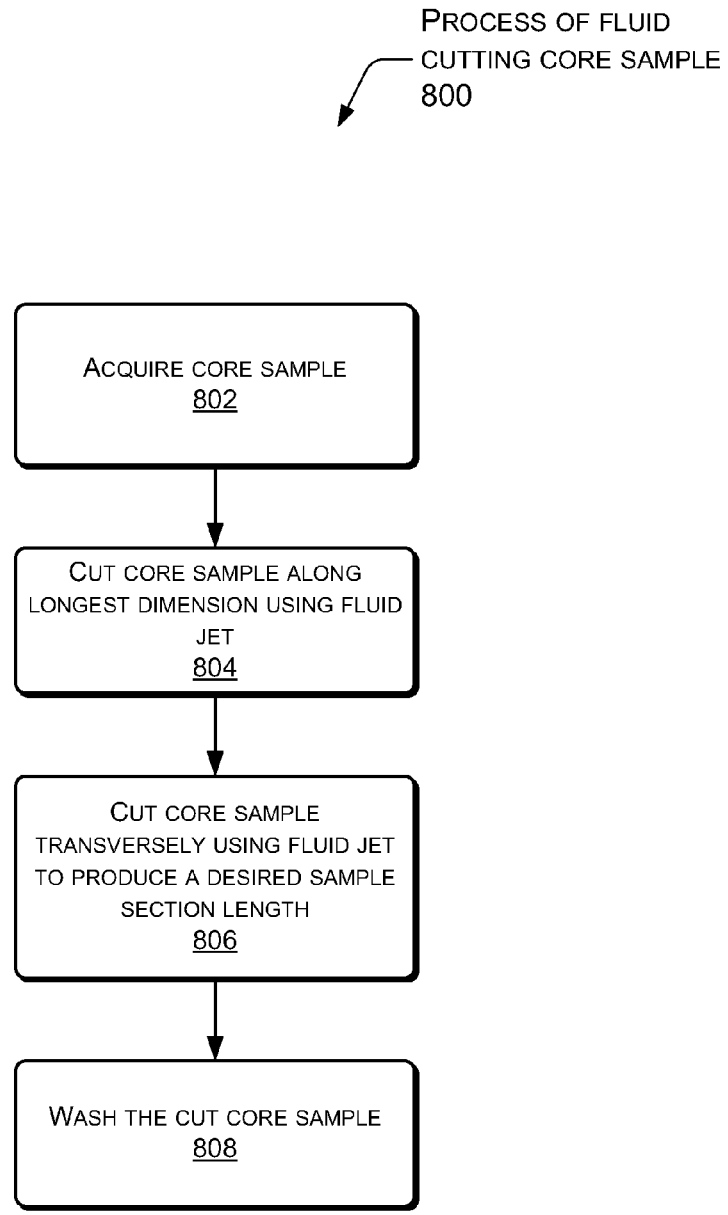
FIG. 8 is a flow diagram of an illustrative process of fluid cutting a core sample.

FIG. 8 is a flow diagram of an illustrative process 800 of fluid cutting a core sample. Core samples include geologic core samples, concrete core samples, and so forth. At 802, a core sample 102 is acquired. For example, a corer attached to a drilling rig may cut a core sample out of rock. At 804, the fluid cutter 104 cuts the core sample 102 along its longest dimension using a fluid jet 106. The pressure and the cutting/feed rate may be adjusted to avoid "pocketing," which allows abrasive materials into fractures or void voids in the core sample. To minimize contamination and improve cutting characteristics, new (unused) abrasive may be used. The fluid jet 106 mechanisms, including fluid jets with abrasives, are discussed in more depth below with regards to FIG. 13.

At 806, the fluid cutter cuts the core transversely to the longest dimension to produce a desired sample section length. For example, the fluid jet may cut a long core sample into two-foot lengths to ease handling, storage, and so forth.

At 808, the core sample is washed. This wash removes debris or contaminants deposited on the core sample. This leaves the core sample in a condition suitable for scanning, analysis, inspection, and so forth.

Calibration

In some situations, core samples are assayed for mineral content. To maintain the accuracy of the assay, contamination of the core sample specimen undergoing analysis should be avoided. Where contamination is unavoidable, the contamination should be characterized to allow for compensation during the assay. To characterize contamination, a combination of one or more of the following processes may be employed.

Figure 9:
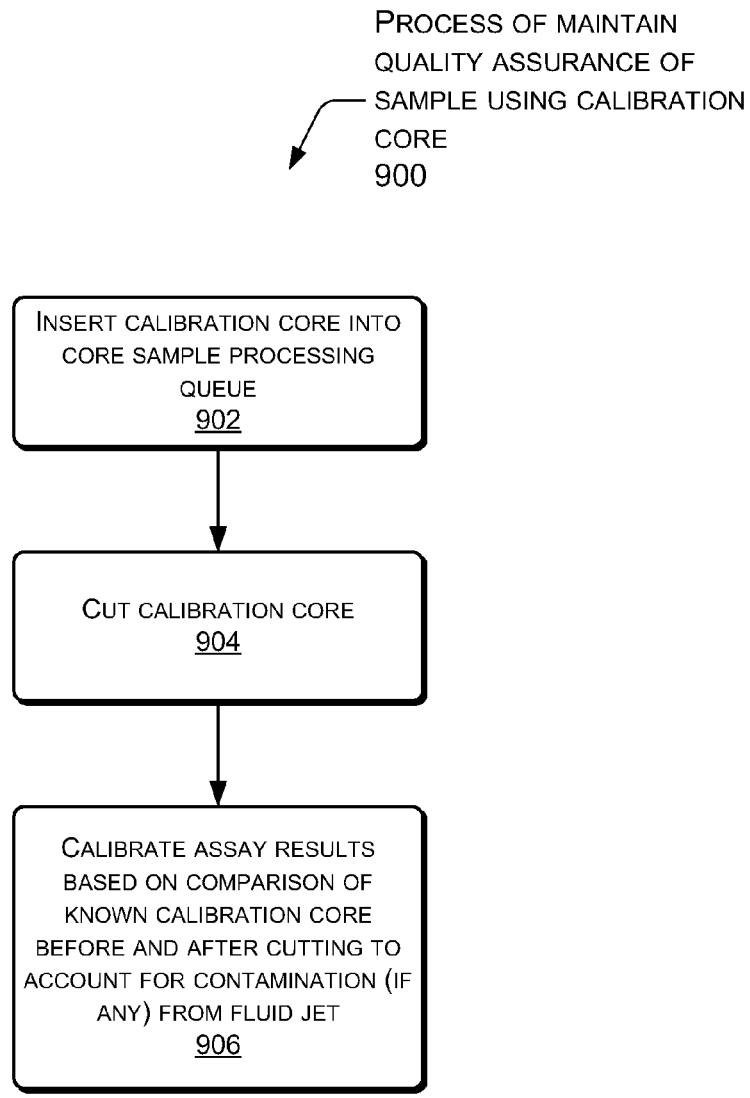
FIG. 9 is a flow diagram of an illustrative process of maintaining quality assurance of the sample using a calibration core.

FIG. 9 is a flow diagram of an illustrative process 900 of maintaining quality assurance of the sample using a calibration core. When the core samples 102 are analyzed for composition, such with an assay, it is worthwhile to use a calibration process. The calibration process allows adjustment for contamination which may result from cutting with the fluid jet. For example, where garnet abrasive is added to the fluid jet, a mineralogist performing the assay would find it beneficial to compensate for potential intrusion of the garnet into the core sample 102.

At 902, a calibration core is inserted into a core sample processing queue. For example, while cutting several hundred feed of core samples, the calibration core may be inserted between core sample sections. The calibration core may comprise a structure having known characteristics. For example, a core of previously analyzed concrete, dolomite, and so forth may be used. In some implementations the calibration core materials are selected to have hardness and other mechanical or physical parameters close to material being sampled. Such commonality between the sampled material and the calibration core may allow for a more accurate determination of contaminants resulting from the cutting operation. Multiple calibration cores may be inserted throughout the core sample cutting process, to allow for ongoing quality assurance and calibration data.

At 904, the calibration core is cut by the fluid jet. At 906, assay results are calibrated based at least in part upon the comparison of the known calibration core before and after cutting. This allows the assayer to account for contamination, if any, resulting from the fluid jet cutting process.

Figure 10:
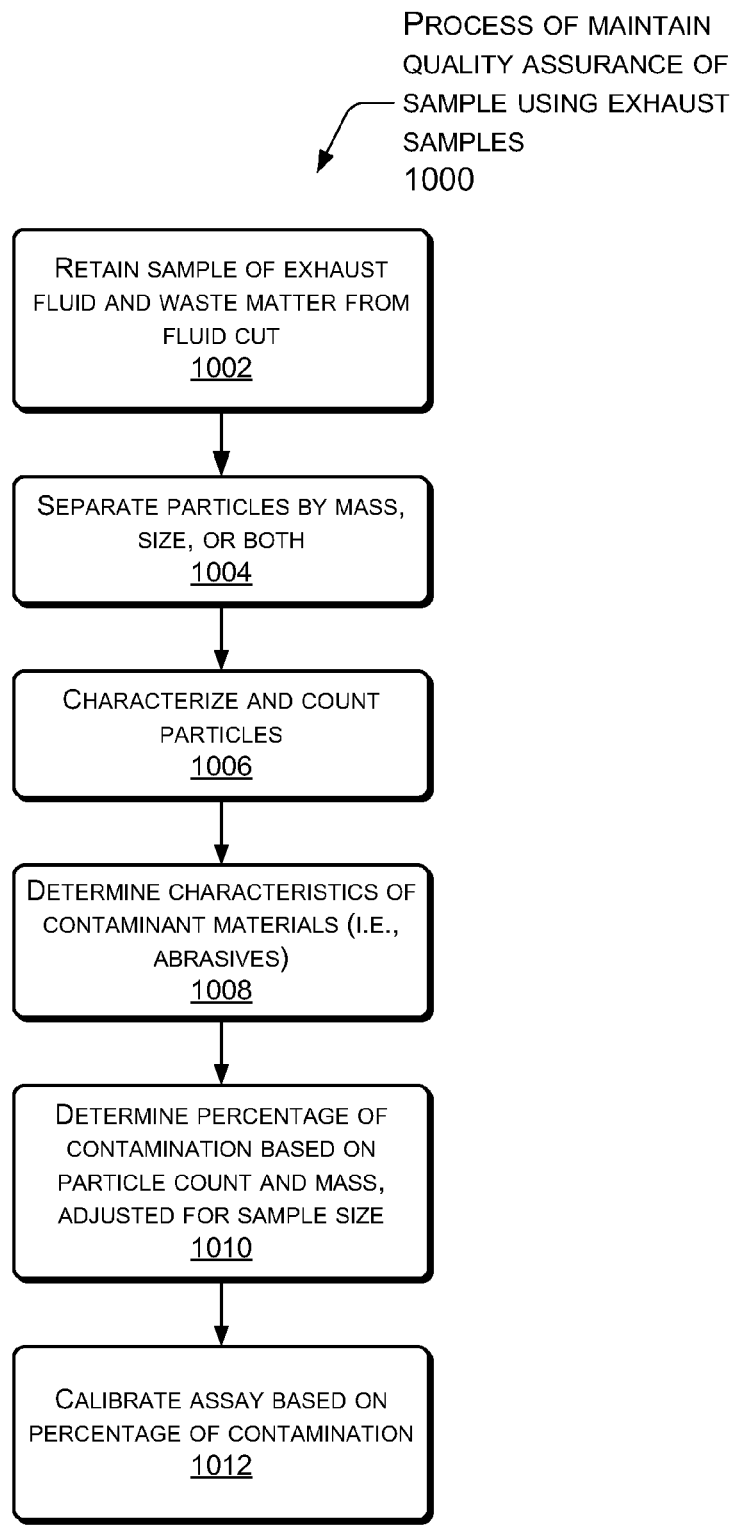
FIG. 10 is a flow diagram of an illustrative process of maintaining quality assurance of the sample by sampling exhaust materials from the fluid cutting.

FIG. 10 is a flow diagram of an illustrative process 1000 of maintaining quality assurance of the core sample by sampling exhaust materials from the fluid cutting. At 1002, a sample of exhaust fluid and waste matter from the fluid cut is retained. At 1004, particles are separated by mass, size, or both. At 1006, the particles are characterized and counted. At 1008, characteristics of the contaminant materials are determined. For example, the characteristics of a garnet abrasive used by the fluid cutter 104 are determined.

At 1010, a percentage of contamination based on mass, size, or both and adjusted for the sample size is determined. At 1012, assay results are calibrated based at least in part upon the percentage of contamination.

Figure 11:
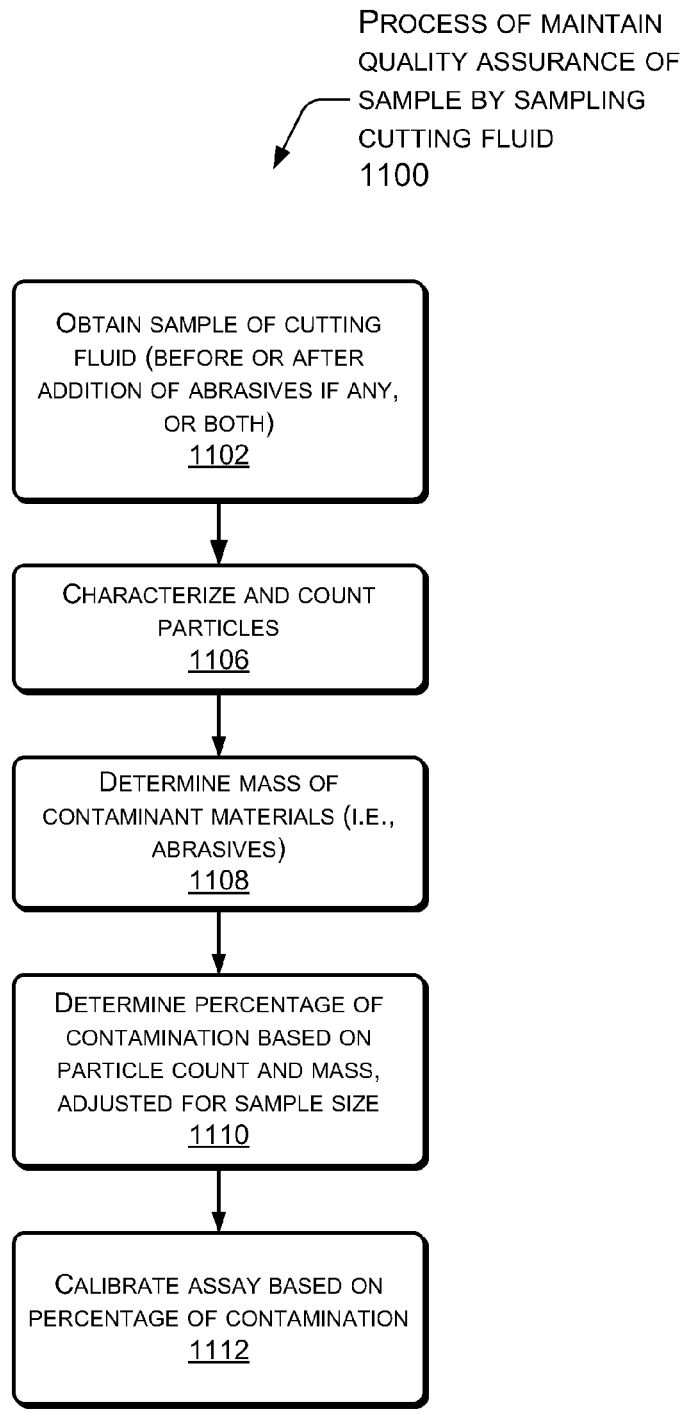
FIG. 11 is a flow diagram of an illustrative process of maintaining quality assurance of the sample by sampling cutting fluid prior to use.

FIG. 11 is a flow diagram of an illustrative process 1100 of maintaining quality assurance of the sample by sampling cutting fluid prior to use. At 1102 a sample of cutting fluid is obtained. When abrasives are used in the cutting fluid, samples may be obtained before, after, or both before and after addition of the abrasives to the cutting fluid.

At 1106 particles in the cutting fluid are characterized and counted. At 1108, a mass of contaminant materials is determined. At 1110, a percentage of contamination based at least in part upon the particle count and mass, adjusted for the sample size, is determined. At 1112, assay results are calibrated based at least in part upon the percentage of contamination.

Figure 12:
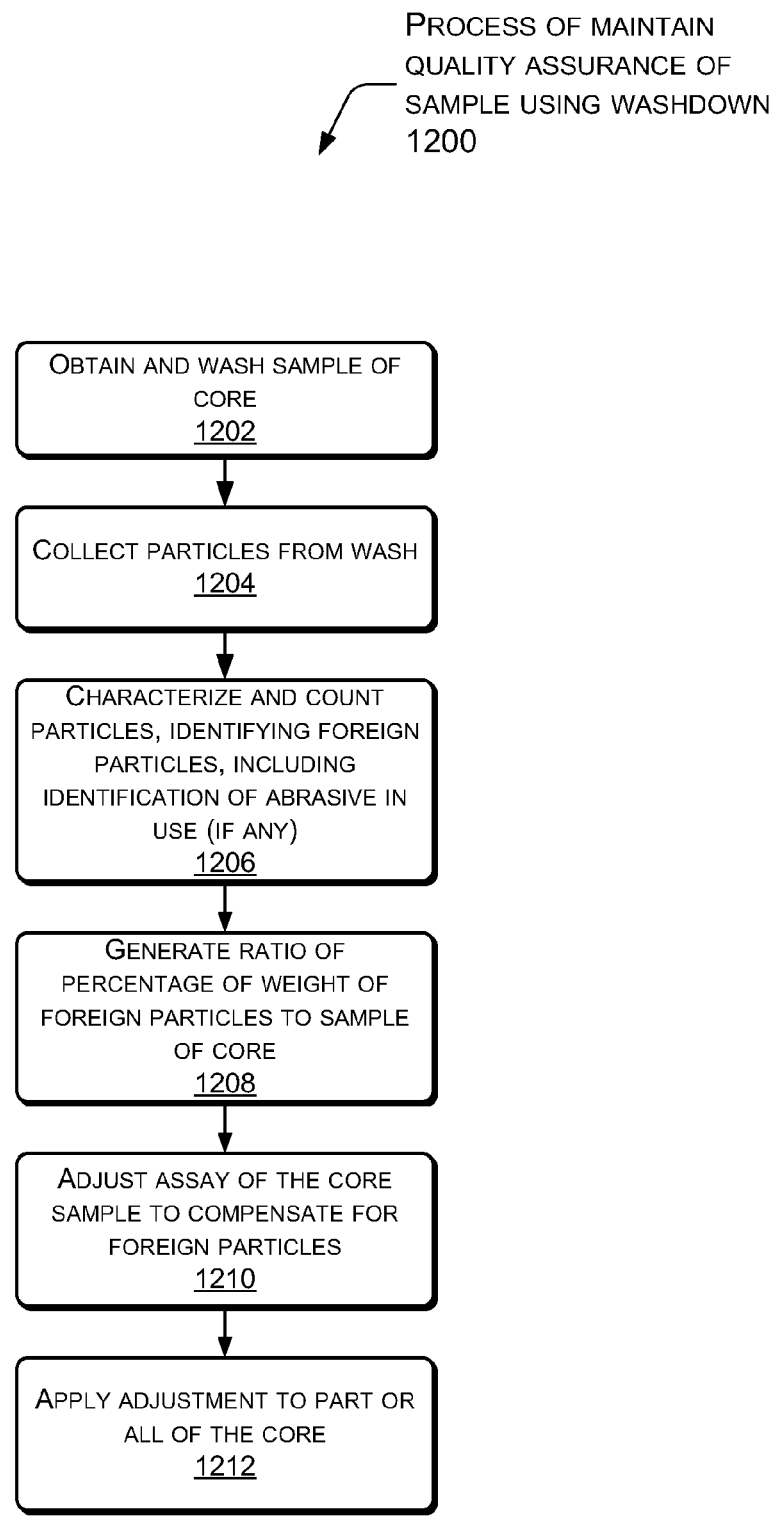
FIG. 12 is a flow diagram of an illustrative process of maintaining quality assurance of the sample using a wash-down sample.

FIG. 12 is a flow diagram of an illustrative process 1200 of maintaining quality assurance of the sample using a washdown sample. At 1202, a cut sample of core is obtained and washed. At 1204, particles are collected from the wash. At 1206, particles in the wash are characterized and counted and foreign particles including any abrasive (if any) are identified.

At 1208, a ratio of percentage of weight of foreign particles to the core sample is generated. At 1210, an assay of the core sample is adjusted to compensate for the foreign particles. At 1212, the adjustment is applied to at least a portion of the core samples.

Fluid Jet Mechanism

Figure 13:
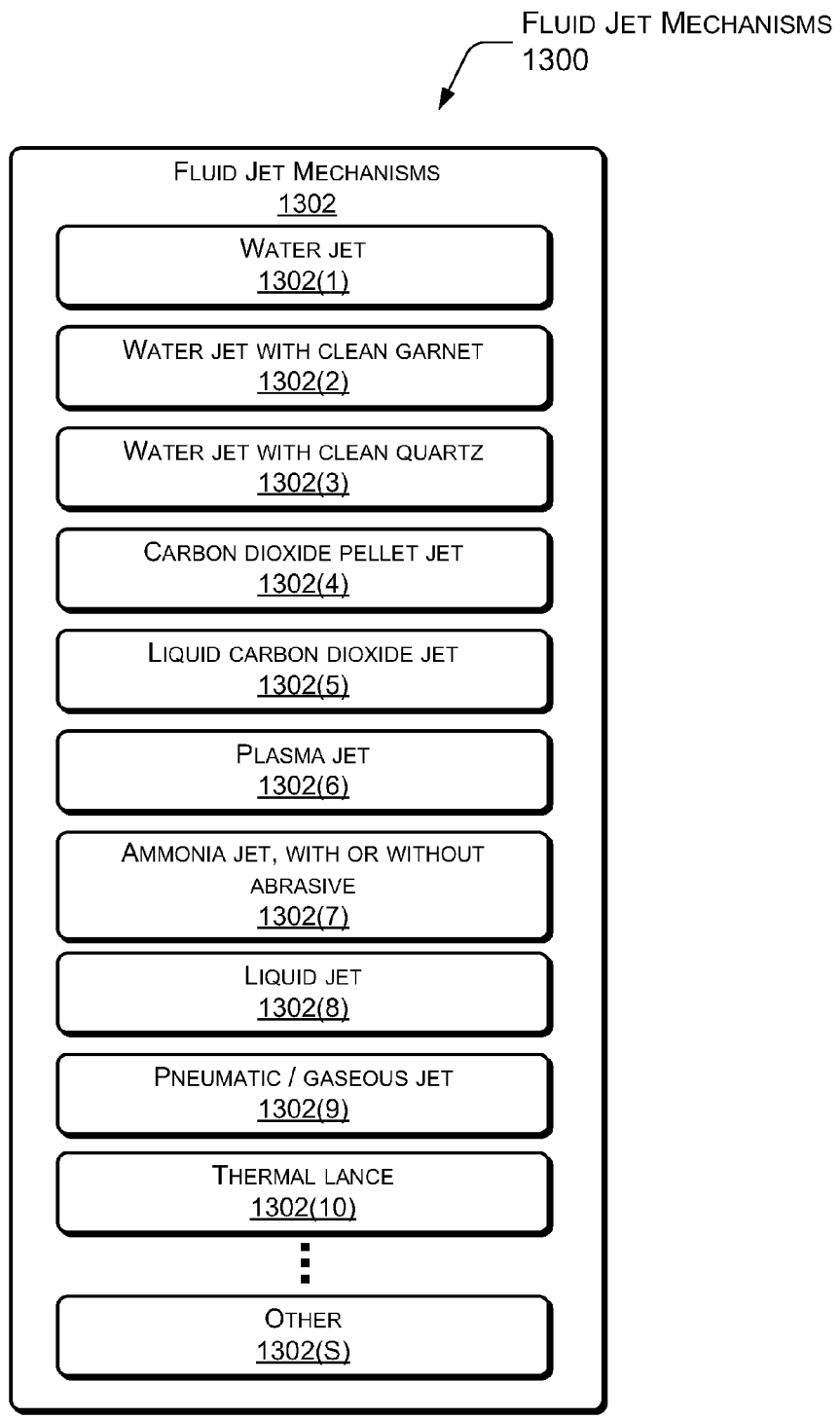
FIG. 13 is a block diagram illustrating selected fluid cutter mechanisms for cutting the core samples.

FIG. 13 is a block diagram illustrating selected fluid jet mechanisms for cutting the core samples 102. A variety of fluid jet mechanisms 1302 are available for use. A particular fluid jet mechanism, and the characteristics thereof, may be selected to match the particular characteristics of the core sample material which is expected. The fluid jet mechanism characteristics include fluid pressure, nozzle configuration, feed rate, and so forth.

A water jet 1302(1) comprising a stream of water may be used to cut materials. The water jet 1302(1) conveys an advantage in that it is unlikely to contaminate the core samples.

Some materials in core samples may be too hard to cut effectively with water alone. A water jet with clean garnet 1302(2) may be used. Clean garnet provides good cutting capabilities, while being inexpensive and easy to characterize and calibrate for. Where garnet is unsuitable or undesired, a water jet with clean quartz 1302(3) particles allows for cutting of materials requiring an abrasive.

Where the potential for contamination from garnet, quartz, or other mineral abrasives is undesirable, non-mineral abrasives may be used. A carbon dioxide pellet jet 1302(4) injects pellets of frozen carbon dioxide into the fluid stream such as water. The pellets act as an abrasive, but are environmentally benign, dissipate harmlessly, and do not result in contamination of the core samples 102. In addition to carbon dioxide, other compounds or elements which normally exist as a gas or fluid at typical atmospheric pressures and temperatures may also be used. Another fluid jet mechanism is a liquid carbon dioxide jet 1302(5). As with the pellets, the liquid carbon dioxide jet 1302(5) reduces or eliminates the potential for contamination from an abrasive of the samples.

Other fluids may also be used. A plasma jet 1302(6) provides a useful cutting tool, particularly for core samples having refined metal or high grade metal ore in them. An ammonia jet, with or without added abrasive 1302(7), or other liquid jet 1302(8), such as an oil, may be used. Pneumatic or gaseous jets 1302(9) with or without abrasives are usable in some situations. For materials which melt readily a thermal lance 1302(10) may be used. Other fluid jet mechanisms 1302(S) are also available.

The fluid jet mechanisms 1302 may be used alone or in combination to cut core samples. For example, during the course of cutting a long core sample, materials of varying characteristics may be encountered. A water jet 1302(1) may be used to cut some materials, while a water jet with clean garnet 1302(2) may be used to cut harder materials. When a section of core samples are presented which are particularly prone to contamination by the garnet, the carbon dioxide pellet jet 1302(4) may be used instead.

Illustrative Core Sample Processing Architecture

As described above, traditional core sample preparation has involved arduous and time consuming processes. Processing delays introduce costly waiting for expensive core sampling operations. Given the techniques and devices described in this disclosure, it is now possible to provide rapid and comprehensive core sampling either at a given location, or at a coring site.

Figure 14:
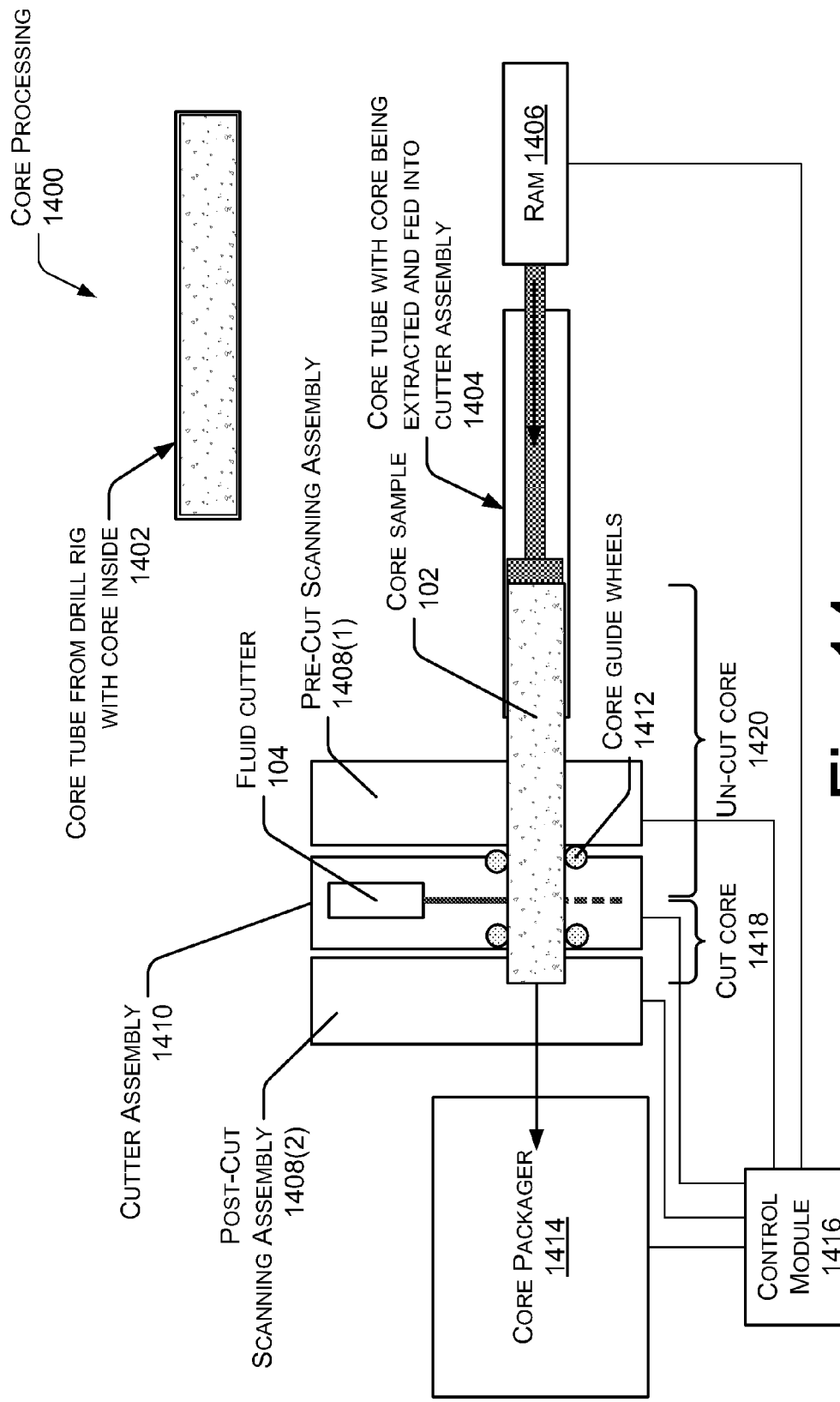
FIG. 14 illustrates a core processing system.

FIG. 14 illustrates a core processing system 1400 which allows for rapid processing including cutting, scanning, and storage of core samples. Shown is a core tube 1402 from a drill rig with a core sample 102 inside. The core sample 102 is extracted 1404 from the core tube, such as with a ram 1406 or other mechanism. As depicted, the core sample is processed upon exit from the core tube. In other implementations, the core samples may be stored in a carrier and processed at a later time and/or location.

Figure 15:
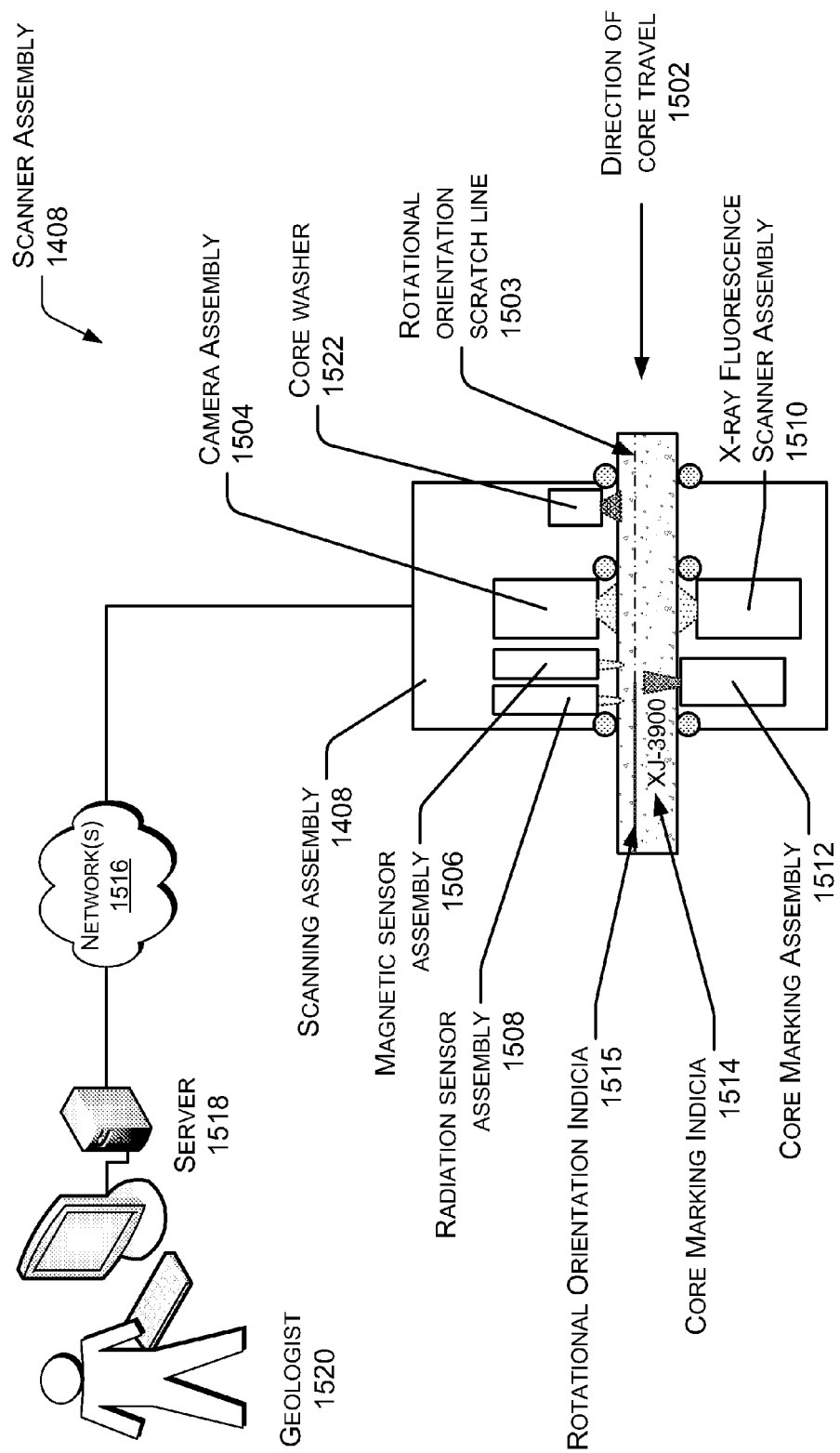
FIG. 15 illustrates a core scanner assembly.
Figure 16:
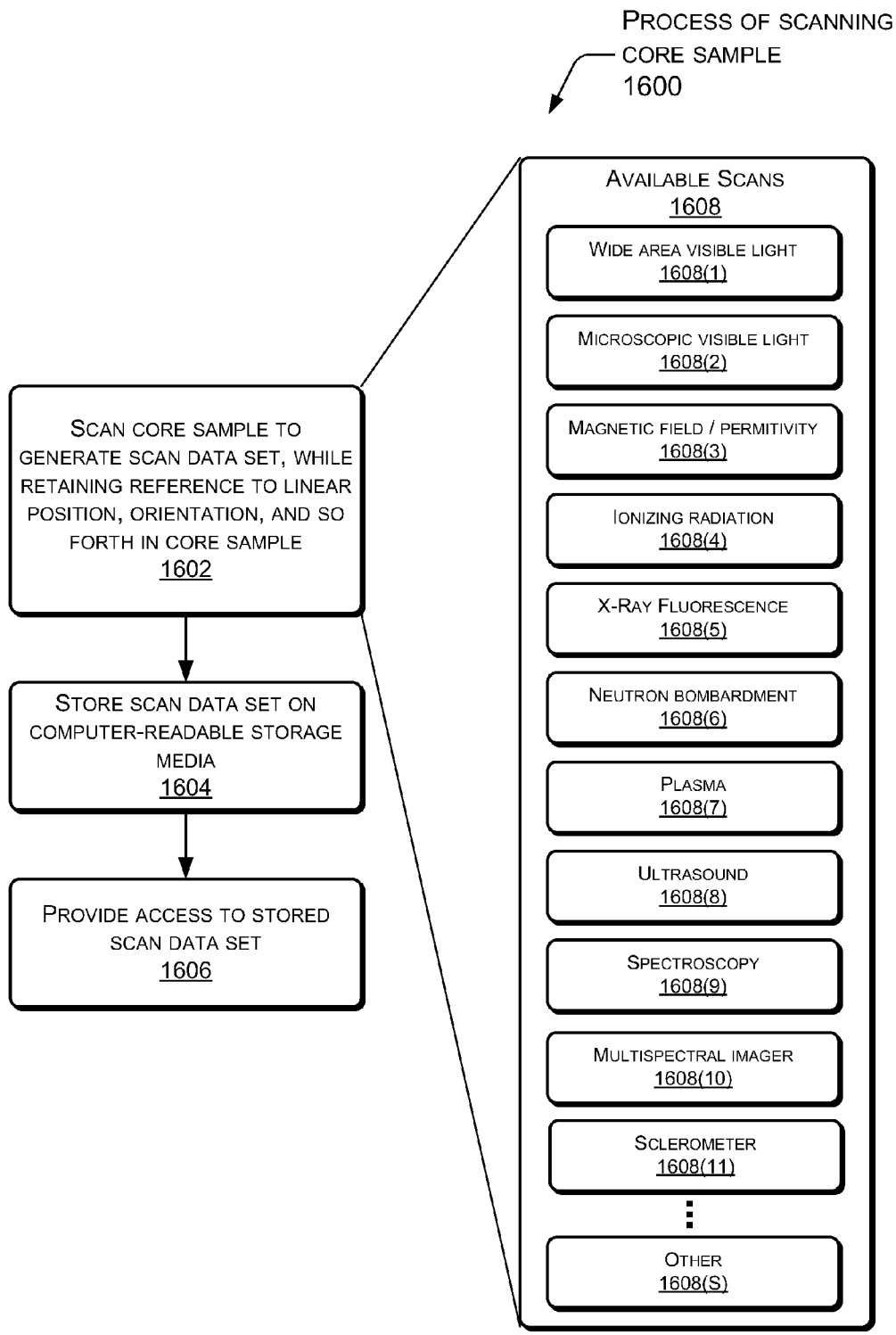
FIG. 16 is a flow diagram of an illustrative process of scanning a core sample, as well as scans which may be used.

The core sample 102, pushed by the ram 1406, proceeds into a pre-cut scanning assembly 1408(1) for pre-cut scanning of the core sample. The pre-cut scanning of an un-cut core 1420 scans characteristics apparent from the exterior of the core sample 102. For example, the pre-cut scanning assembly 1408(1) may store information regarding rotational orientation of the core. Such rotational orientation information may include a scratch or marking on the core itself, a marking or other indicia from the core tube 1402, and so forth. FIGS. 15 and 16 below discuss the scans provided by the scanning assembly 1408 in more detail.

A cutter assembly 1410 accepts the un-cut core 1420, and cuts the core sample 102 with the fluid cutter 104. In some implementations, an operator, either onsite or remote, may re-orient the fluid cutter 104 to obtain a desired split of the core sample 102, or use a roller mechanism (not shown) to rotate the sample prior to cutting with the fluid cutter 104. In another implementation, such rotation and determination of how to split the core sample 102 may be automated.

Core guide wheels 1412, slides, bearings, or other mechanisms or structures maintain alignment of the core sample 102 alignment for scanning, cutting, and so forth. In some implementations the core sample 102 may remain stationary while the cutter assembly 1410 and other assemblies move, relative to the core sample 102.

A post-cut scanning assembly 1408(2) scans the cut core 1418. The post-cut scanning obtains data from at least the interior faces of the cut, capturing interior structure of the core sample 102.

In some implementations, a single scanning assembly may be used. In such an implementation a single scanning assembly 1408, the cut core sample 102, or both, move relative to one another after the cut is complete to obtain the post-cut scan. Such an implementation allows a reduction in cost due to the use of a single scanning assembly for both pre- and post-cut scans.

Once scanned and cut, core samples 102 may be packaged by the core packager 1414. The core packager 1414 may manual or automatic, and involves the placement of the cut core samples 102 into carriers or storage containers.

A control module 1416 may comprise mechanical, electronic, or other control mechanisms suitable for operating the system components. For example, a processor coupled with a computer readable medium storing instructions may be used to control the system components. As shown here, the control module 1416 is coupled to the ram 1406, the scanning assemblies 1408, the cutter assembly 1410, the core packager 1414, and so forth. In other implementations, some system components may operated independently of the control module 1416. The control module 1416 may be configured to store scan data generated by the scanning assembly(s) 1408 and store scan data to one or more computer readable storage media.

FIG. 15 illustrates components of the scanner assembly 1408 of FIG. 14. While the scanning assembly 1408 shown here depicts the core sample 102 proceeding along a direction of core travel indicated by arrow 1502, in some implementations, the core sample 102 may be stationary, while the scanning assembly 1408 moves.

The camera assembly 1408 may be configured to scan a full exterior circumference of the core, as well as the interior of the core after cutting. In some implementations, the exterior circumference may be scanned by the pre-cut scanner assembly 1408(1), while the interior portion of the cut core is scanned by the post-cut scanning assembly 1408(2).

In some implementations core samples may be drilled and recovered such that rotational orientation, such as the orientation of the core sample to magnetic north, is recorded. One method of doing so is the use of a "scratcher" to mark the core with a rotational orientation scratch line 1503. In other implementations the core orientation may be determined from orientation of the core tube 1402 which may be recorded by the scanning assembly 1408.

The scanning assembly 1408 comprises one or more sensors designed to obtain data from the core sample 102. The process of scanning and scans which may be used are discussed below with regards to FIG. 16.

Sensors in the scanning assembly 1408 may include a camera assembly 1504. As described above, the camera assembly 1504 may be configured to acquire images of the exterior circumference of the core. In one implementation the camera assembly may comprise a plurality of cameras disposed around the core sample 102 such that during operation they acquire images of the complete exterior.

The camera assembly 1504 may contain one or more cameras suitable for generating images in one or more bands of light. The bands of light include ultraviolet, visible, near-infrared, infrared, and so forth. The camera assembly 1504 may also include one or more light sources to illuminate the portion of the core sample 102 undergoing imaging. The camera assembly 1504 may also comprise a high-magnification or microscopic system allowing for detailed imaging of the core sample.

A magnetic sensor assembly 1506 provides characterization of the magnetic field of a sample, and other measurements which utilize magnetic fields. For example, the magnetic sensor assembly 1506 may determine a magnetic permittivity of the core sample.

A radiation sensor 1508 in the sensor assembly 1408 allows for the detection and characterization of ionizing radiation sources within the core sample. For example, the radiation sensor 1508 may incorporate a scintillation counter to determine and characterize ionizing radiation.

An X-ray fluorescence scanner assembly 1510 provides a way to actively characterize the elemental and chemical contents of the core sample. The X-ray fluorescence scanner may utilize a high-energy X-ray source or a gamma ray source.

Other sensor assemblies may also be incorporated. In some implementations information about core density, resistivity, conductivity, and so forth may desired. In such cases, additional sensors or sensor assemblies may be incorporated into the scanner assembly 1408 to gather this information.

A core marking assembly 1512 provides a mechanism for labeling the core samples 102. One of the useful attributes of a core sample is the ability to relate a particular length of core sample 102 to a particular depth within the material being cored, in addition to a rotational orientation of the core sample 102. For example, when an assay discovers a rich vein of gold, it is important to know whether that vein is 100 feet down a drill shaft, or 1000. Also, in some implementations rotational orientation, such as to an external reference point such as magnetic north, is desired.

During conventional splitting and handling of cores, sections of core sample may be misplaced relative to one another. By automatically marking the core samples 102 during processing, such errors are reduced or eliminated. The core marking assembly 1512 may apply one or more indicia to the core sample 102, the carrier 112, or both, as described below with regards to FIG. 17. As shown here, in one implementation the core marking indicia 1514 is printed on the core sample itself. To enhance visibility of the rotational orientation scratch line 1503 when present, or to provide a visual representation of the rotational orientation, a rotational orientation indicia 1515 may also be affixed to the core sample 102 itself. The rotational orientation indicia 1515 may comprise a line, a line with text presenting orientation information, a tag or sticker affixed to the core, a notch or shallow cut generated by the cutter assembly 1410, and so forth.

Coupled to the scanning assembly 1408 and the sensors therein via network 1516 is a server 1518 or other computing device. The network 1516 may comprise computer data network, such as a local area network, wide area network, virtual private network, Internet, and so forth. The server 1518 is configured to store the data set resulting from operation of the scanners and store the data set onto accessible computer readable storage media. In some implementations the computer readable storage media may be directly attached to the server 1518, or be accessible via the network 1516 or another network.

A geologist 1520 may access the server 1518 to view at least a portion of the scan data set. This access may occur onsite and near the core processing system 1400, or from any other location which has access to the scan data set. As a result, the geologist 1520 may be in Hawaii and yet is able to view and analyze a core sample located in Siberia.

The scanner assembly 1408 may also incorporate a core washer 1522. The core washer cleans the surface of the core sample to remove contaminants such as dirt, abrasives, and so forth. The core washer may comprise a air or vacuum based system to remove debris, or a wet system using water or another working fluid to clean the core sample. In some implementations, use of a wet system is advantages before scanning as a wet surface may result in better imaging results. In some implementations where desired sensor operation calls for a dry core sample, a core sample dryer may be used.

FIG. 16 is a flow diagram of an illustrative process 1600 of scanning a core sample, as well as scans which may be used. At 1602, a core sample 102 is scanned while retaining reference to the linear position, rotational orientation, vertical orientation, and so forth of the core sample.

Rotational orientation describes a reference of the sample with regard to a (relatively) fixed point of reference such as the north geomagnetic pole of the Earth. For example, the core sample 102 is oriented with a scratch marking at 90 degrees magnetic north. Such information is useful in the characterization of geologic features, such as the disposition and direction of a fault.

Vertical orientation describes a reference of the sample with regard to a local gravity gradient. For example, a plumb line designates a vertical orientation. Vertical orientation of the core sample may change due to a tilt in the hole from which the core sample is acquired.

At 1604, scan data resulting from the scan is stored on computer-readable storage media. This scan data may be raw data acquired from the scan, or processed data adjusted to account for down-hole survey information. Down-hole survey information defines the actual path of the hole and resulting core samples 102, and includes information such as rotational orientation, vertical orientation, and so forth. This down-hole survey information may be used to "true up" or correct for wander or other variations which may occur during acquisition of the core samples 102.

At 1606, access to the scan data set is provided, such as to a geologist or engineer. As described below with regards to FIG. 19, a user may access this data set via a variety of devices at any number of locations. For example, a geologist may use a tablet computer to remotely access scan data from a site in Siberia while sitting at home in Hawaii.

A variety of scans of the core sample 102 are possible. All of the following scans, as well as any additional scans, may be applied to all or a portion of the core sample 102. At 1608, a partial set of available scans are presented. A wide area visible light scan 1608(1) images the core sample 102 in the visible light band. At 1608, a microscopic visible light scan provides higher resolution images of smaller features. At 1608(3) a magnetic field/permittivity sensor collects data about magnetic fields within the core sample 102, affects of the sample on a known magnetic field, or both. A scan of ionizing radiation 1608(4) such as with a scintillating counter provides data about ionizing radiation sources within the sample. An x-ray fluorescence scan 1608(5) allows for characterization of the mineral and chemical characteristics of the core sample.

Other scans such as neutron bombardment 1608(6), plasma generation and characterization 1608(7), ultrasound 1608(8), spectroscopy 1608(9), multispectral imaging 1608(10), and so forth provide additional details about the characteristics of the core sample 102. A scelerometer 1608(11) may also be incorporated into scans to measure the scratch hardness of materials.

Other scans 1608(S) may be added, as desired. For example, the core sample may be scanned using magnetic resonance for material characterization as well as imaging. In some implementations, core density, resistivity, conductivity, and so forth may also be scanned and ascertained.

Figure 17:
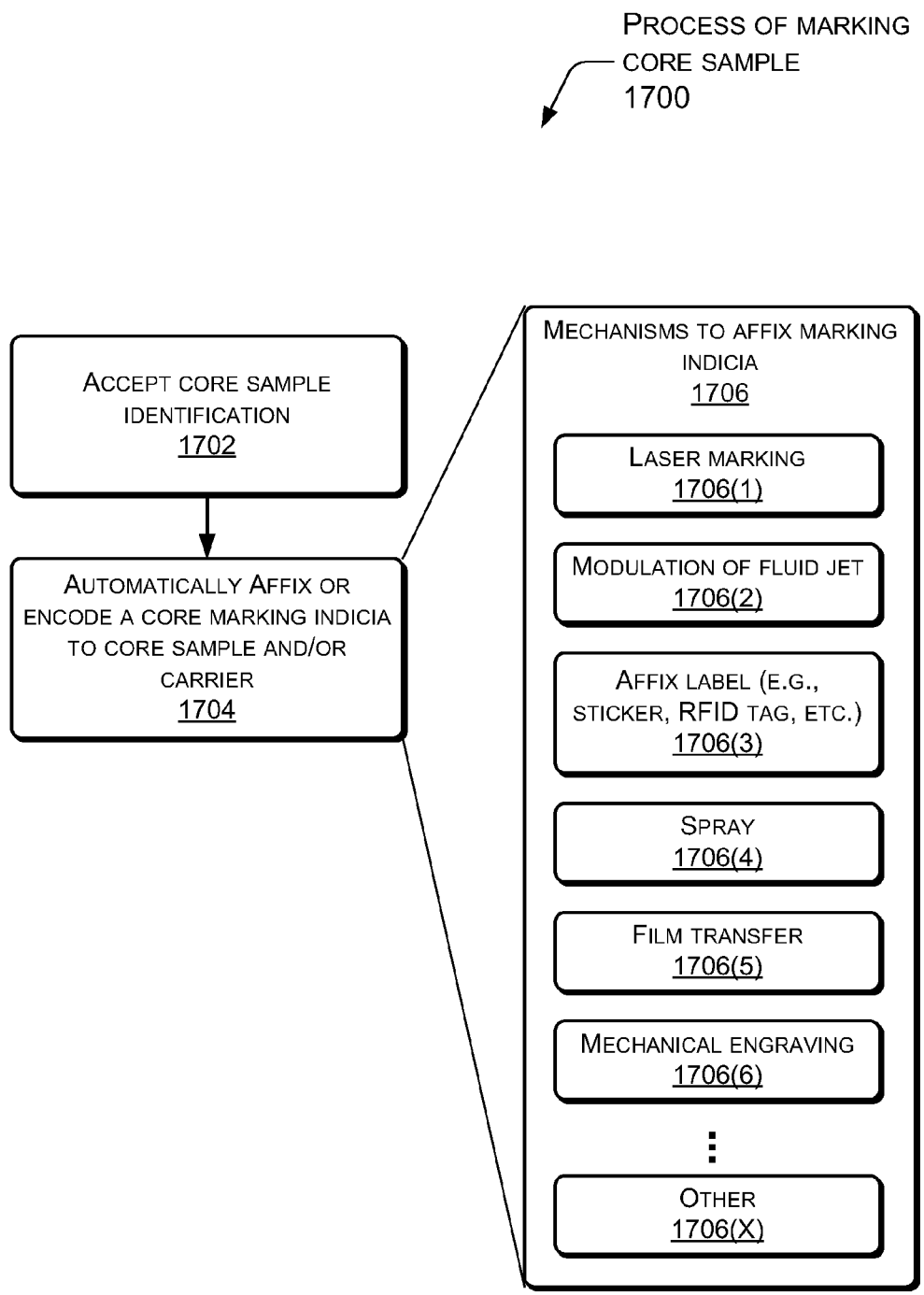
FIG. 17 is a flow diagram of an illustrative process of marking a core sample, as well as mechanisms to affix marking indicia.

FIG. 17 is a flow diagram of an illustrative process 1700 of marking a core sample, as well as mechanisms to affix marking indicia. As described above, it can be useful to maintain a known relationship between location, orientation, and so forth of the core sample 102. Because the entire length of a core sample may exceed thousands of feet, proper marking and tracking of each core sample section is desirable.

At 1702 a core sample identification is received. For example, the control module 1416 of the core processing system 1400 may receive input indicating that a given length of core sample starts at length 2,135 feet. At 1704, the core marking assembly affixes to, or encodes within, the core sample the core marking indicia 1514. In some implementations indicia may be applied to a carrier along with, or in addition to, the core marking indicia 1514 on the core sample.

One or more mechanisms to affix marking indicia 1706 may be used. The marking indicia may be human readable, machine readable, or both and rendered or affixed to the core sample, carrier, or both. Laser marking 1706(1) burns, melts, discolors, or otherwise alters the surface to provide a marking. The fluid jet may be modulated 1706(2) and directed to cut or etch markings. A label 1706(3) may be affixed, such as a sticker, radio frequency identification tag (RFID), and so forth. Indicia may be generated by a spray 1706(4) or other application of a paint to the surface. A film transfer 1706(5) printing process allows for marking, as well as mechanical engraving 1706(6). Other 1706(X) mechanisms may be used to mark the surface with indicia, including acid etching, paint rollers, and so forth.

Furthermore, in the event the core marking indicia becomes unusable or is in dispute, the core sample section may be re-scanned. The re-scanned data set may be compared with the core data set previously stored and the matching section identified.

Figure 18:
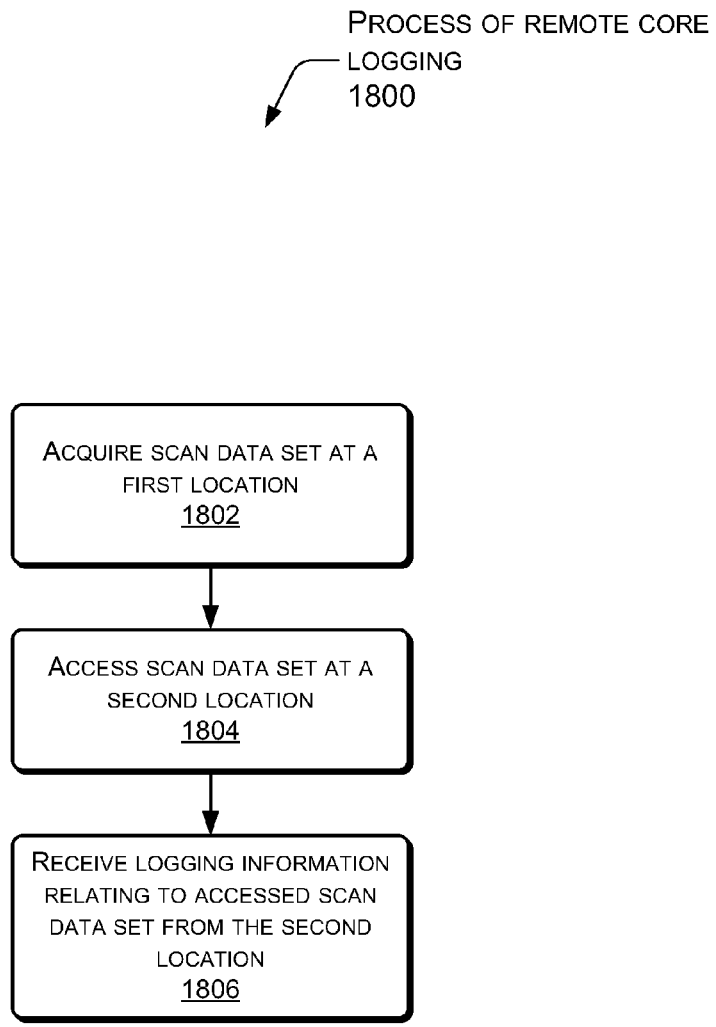
FIG. 18 is a flow diagram of an illustrative process of remotely logging a core sample.

FIG. 18 is a flow diagram of an illustrative process 1800 of remotely logging the core sample 102. Logging is when a geologist or engineer inputs their analysis of the core sample. Because the scanning assembly 1408 has generated the scan data set of the core sample 102, the core sample 102 may be logged remotely.

At 1802, a scan data set of a core is acquired from a first location. For example, the scanning assembly 1408 generates a scan data set in the core processing system 1400 at a drill site in Siberia. At 1804, scan information is accessed at a second location. For example, a geologist at home in Hawaii accesses the scan data set.

At 1806, logging information relating to the accessed scan data set is received from the second location. For example, the geologist has characterized a particular section of the core sample.

Figure 19:
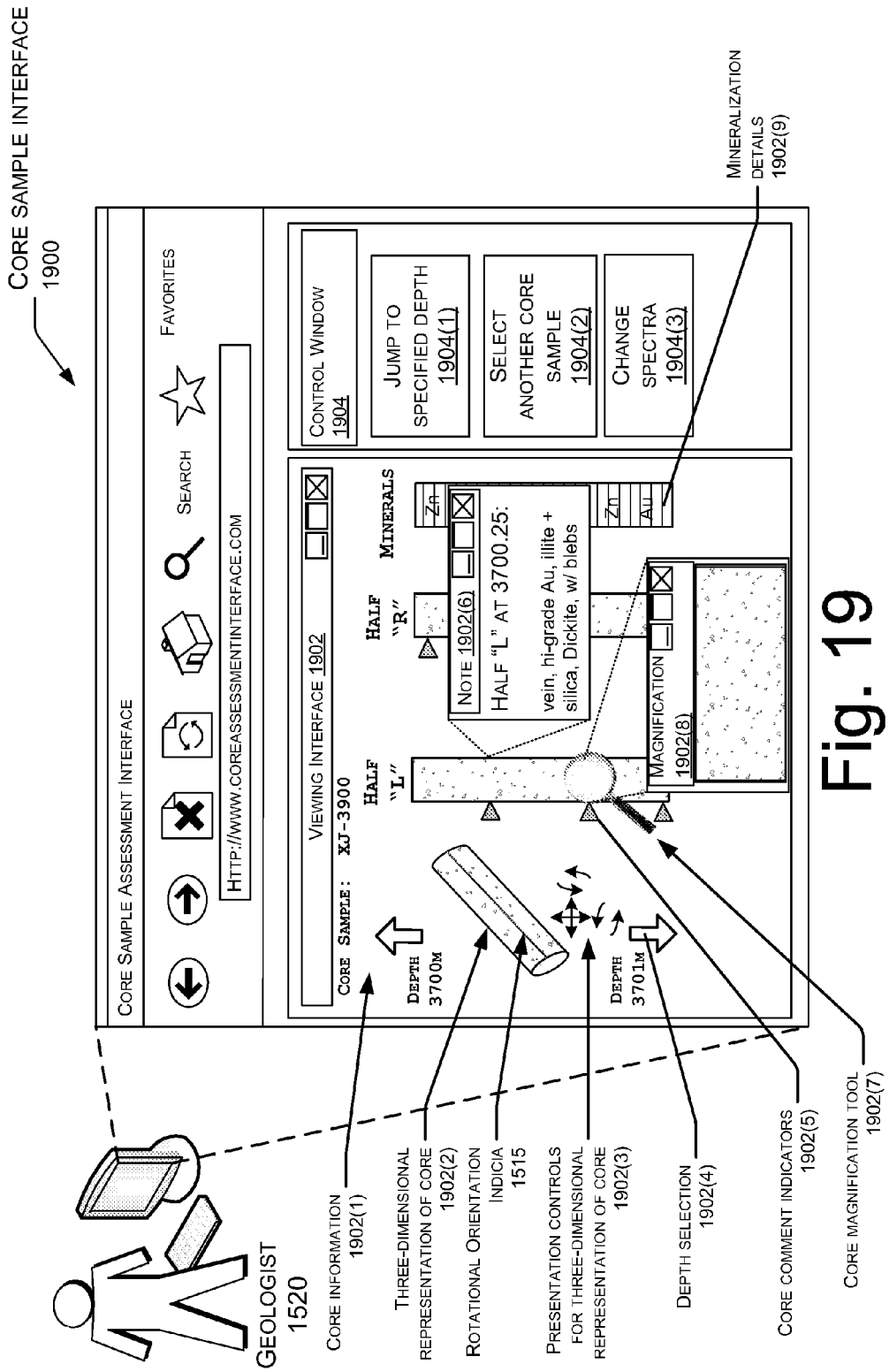
FIG. 19 illustrates a core sample interface.

FIG. 19 illustrates a core sample interface 1900. This core sample interface may be used for logging, reviewing the core sample data set, and so forth. Devices including personal computers, laptops, tablet computers, netbooks, smartphones, and so forth may be used to present the core sample interface 1900. At 1902 a viewing interface provides images of a core sample under study. A user, such as the geologist 1520 is able to access a variety of information, including core information 1902(1) showing the core sample identification.

A three-dimensional representation of the core 1902(2) is depicted, along with controls 1902(3) to modify the presentation. The rotational orientation indicia 1515 is shown as part of the three-dimensional representation of the core 1902(2). A depth (or linear distance) selection 1902(4) control allows the user to scroll along the length of the core sample.

The faces of the core sample cut by the water jet are presented, showing the left and right halves, as well as core comment indicators 1902(5) where details about that particular region of the core sample have been entered. In some implementations, the user may toggle to display a view the exterior of the core samples 102. At 1902(6) one of the core comment indicators 1902(5) is accessed showing details of the left half of core sample XJ-3900 at 3700.25 feet depth. A core magnification tool 1902(7) provides a magnified view 1902(8) of the core sample at a selected area. In some implementations this magnified view may enlarge an existing macro image, or toggle to an image taken with a magnifying lens or microscope.

A display strip showing mineralization details 1902(9) also appears in the viewing interface 1902. These mineralization details 1902(9) provide a quick visual indicator to minerals of interest within the core sample.

A control window 1904 provides several controls, which when activated, allow the user to alter presentation of information in the viewing interface 1902. A jump to specified depth 1904(1) allows the user to access a particular portion of the core sample without scrolling. A control to select another core sample 1904(2) allows the user to change the core sample presented. A change spectra 1904(3) control allows the user to toggle between different spectral bands or other sensor data which is available. For example, the user may toggle to view the core in ultraviolet, or see a mapping of ionizing radiation counts.

In some implementations, the presentation of the core sample may be adjusted to show a representation of the core sample consistent with correction resulting from the down-hole survey data. For example, a wander or tilt in the hole would be reflected by a wandering or tilted presentation of the core.

Figure 20:
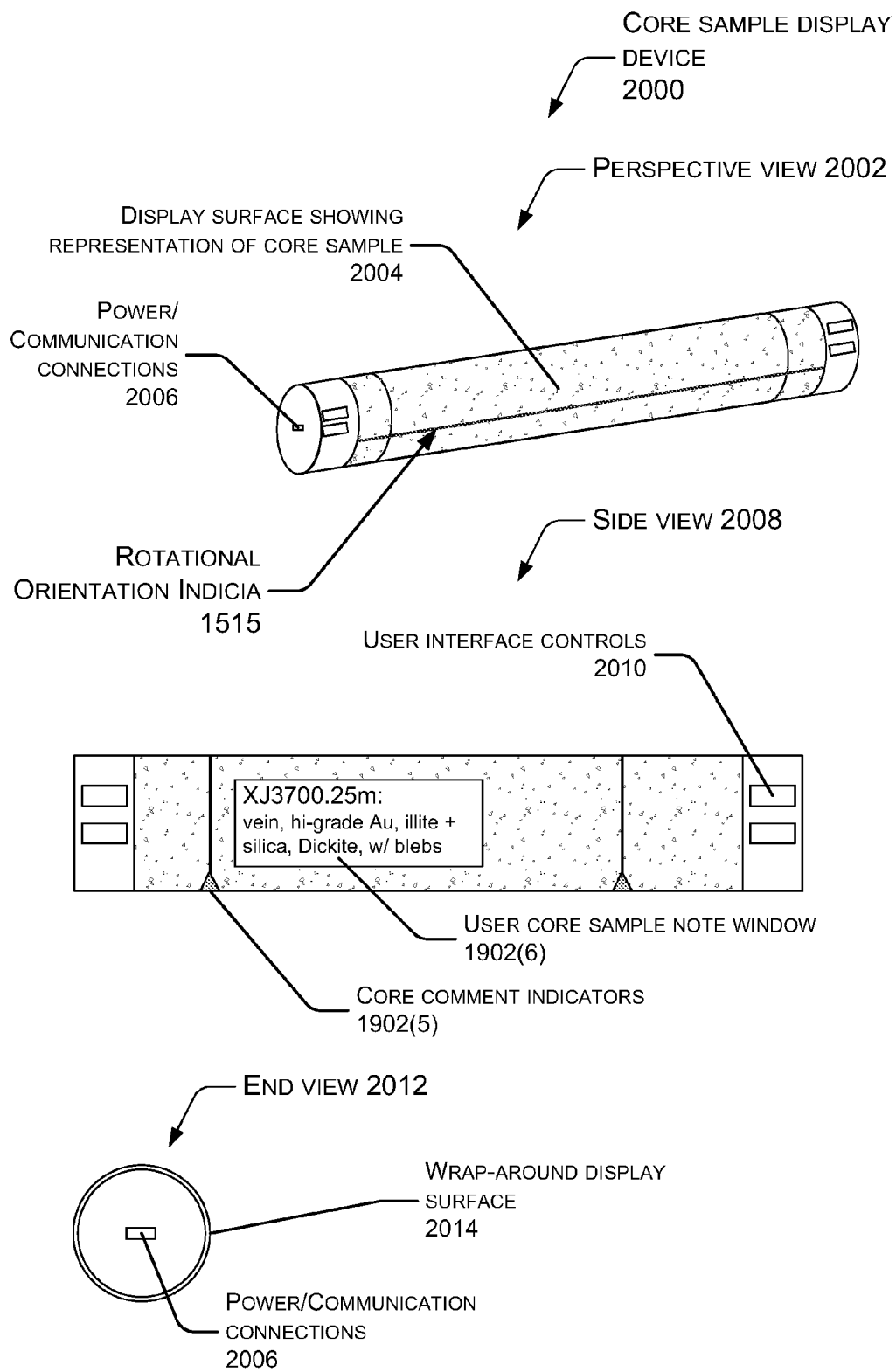
FIG. 20 illustrates a core sample display device.

FIG. 20 illustrates core sample display device (CSDD) 2000. Geologists and engineers who regularly work with core samples may find it easier and faster to characterize core samples from the core data set when the presentation simulates the experience of actually viewing and manipulating a physical core sample.

A perspective view 2002 shows a CSDD having a display surface 2004 which is configured to show a representation of the core sample, as taken from at least a portion of the core data set. Power and communications connections 2006 are shown on at least one end of the device.

A side view 2008 shows additional details of the CSDD. User interface controls 2010 are depicted on either side of the device, where the users would rest in holding the CSDD. In some implementations the entire perimeter of the cylinder may be a display surface and touch sensors may be used to accept user input. Internal sensors such as accelerometers, tilt sensors, and so forth may also be used to accept user input.

Shown on the display surface 2004 is the user core sample note window 1902(6) along with the core comment indicators 1902(5) as described above. An end view 2012 shows a wraparound display surface 2014 which covers the exterior of the surface, excluding the ends.

Figure 21:
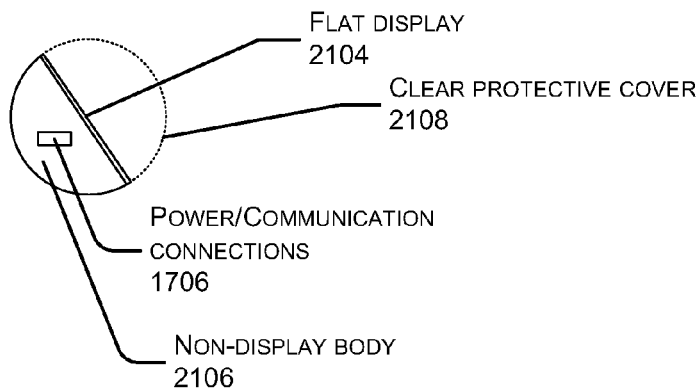
FIG. 21 illustrates alternative core sample display device configurations.

FIG. 21 illustrates alternative configurations 2100 of the core sample display device (CSDD). In a first configuration, an end view shows a flat display 210 within the cylindrical case 2102. A non-display body 2106 comprises the back of the device, while a clear protective cover 2108 may extend over the flat display 2104 to retain the familiar cylindrical shape.

A second configuration comprising an end view of a half-wrap around 2110 is shown. A partial wrap-around display surface 2112 is disposed on a half of the cylinder surface proximate to the user during use. A non-display surface 2114 comprises the back half opposite the display surface.

Figure 22:
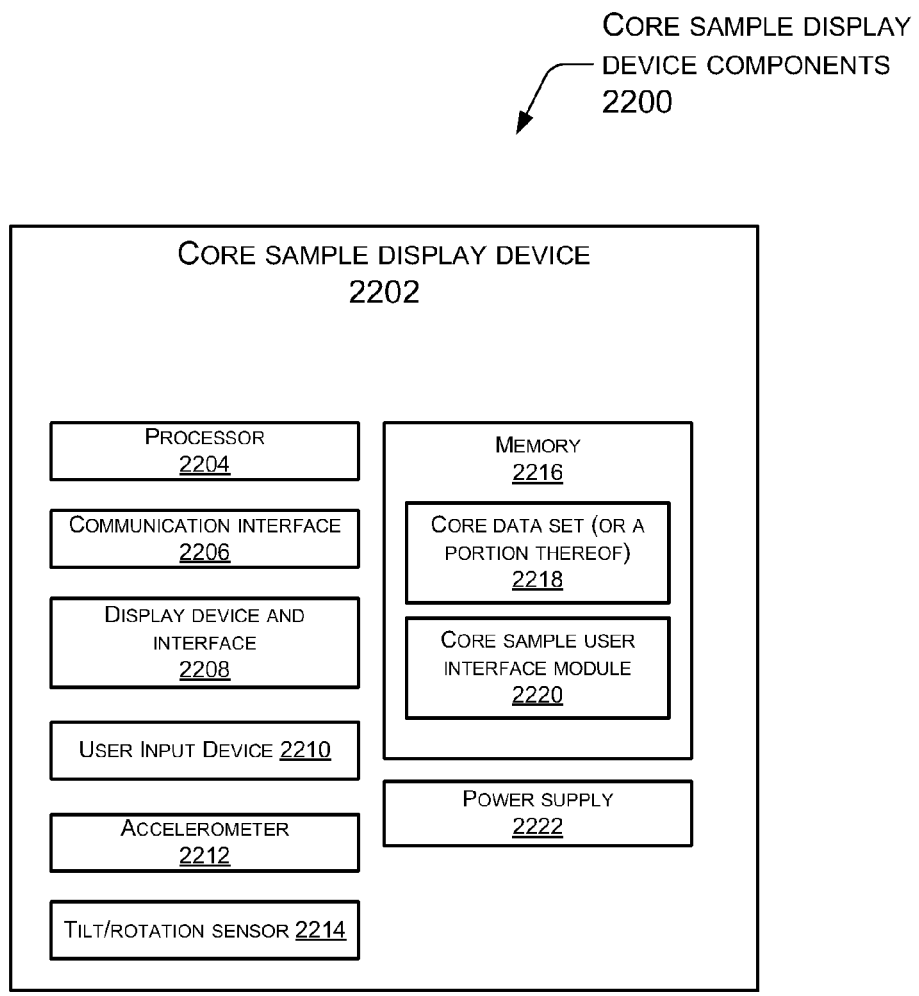
FIG. 22 is a schematic diagram of some of the components comprising the core sample display device.

FIG. 22 is a schematic 2200 of some of the components comprising the CSDD. A processor 2202(1) configured to execute instructions is shown. A communication interface 2206 provides connectivity to the computer network 1516 or another computing device. The communication interface 2206 may be wired, wireless, or both. A display device and interface 2208 are configured to present core sample data to a user. The display device may comprise a liquid crystal display, organic light emitting diode, cholesteric, electrophoretic, or other display technology.

One or more user input devices 2210 are present to accept user input which may be used, at least in part, to alter the presentation of data on the display device. The user input devices may include touch sensors, buttons, mouse, keyboard, joystick, voice input, and so forth. An accelerometer 2212 allows movements of the CSDD to be interpreted by the processor 2204 as user input. For example, a user shaking the CSDD may result in the display presenting an exploded view of the core sample. Similarly, a tilt/rotation sensor 2214, or the accelerometer 2210, accepts tilting, rotating, or a combination of these motions as inputs. For example, a user may tilt the CSDD so the right-hand end is lower than the left-hand end, resulting in the core sample presented on the display appearing to slide towards the right-hand end.

The CSDD also incorporates a memory 2216. The memory 2216 may include, but is not limited to, RAM, ROM, flash memory, or any other medium or memory technology able to store data for access by the processor 2204. The memory 2216 may be used to store any number of functional components that are executable on the processor 2204. Stored within the memory 2216 is the core data set, or a portion thereof, 2218. A core sample user interface module 2220 is also stored in the memory 2216.

A power supply 2222 provides electrical power for the operation of the CSDD. The power supply may comprise a battery, power regulators, and so forth.

Conclusion

As used in this application, letters within parentheses, such as "(S)" or "(C)", denote any integer number greater than zero. Although the subject matter has been described in language specific to structural features and/or methodological acts, it is to be understood that the subject matter defined in the appended claims is not necessarily limited to the specific features, dimensions, or acts described. Rather, the specific features, dimensions, and acts are disclosed as illustrative forms of implementing the claims. Moreover, any of the features of any of the devices described herein may be implemented in a variety of materials or similar configurations.

Although specific details of illustrative methods are described with regard to the figures and other flow diagrams presented herein, it should be understood that certain acts shown in the figures need not be performed in the order described, and may be modified, and/or may be omitted entirely, depending on the circumstances. As described in this application, modules and engines may be implemented using software, hardware, firmware, or a combination of these. Moreover, the acts and methods described may be implemented or control by a computer, processor or other computing device based on instructions stored on memory, the memory comprising one or more computer-readable storage media (CRSM).

The CRSM may be any available physical media accessible by a computing device to implement the instructions stored thereon. CRSM may include, but is not limited to, random access memory (RAM), read-only memory (ROM), electrically erasable programmable read-only memory (EEPROM), flash memory or other solid-state memory technology, compact disk read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by a computing device.

What is claimed is:

1. A method of operating a core processing apparatus, the method comprising:
   causing the core processing apparatus to:
      extract a core sample;
      perform a first scan of the core sample;
      after performing the first scan of the core sample, cut the core sample along a longest dimension of the core sample using a fluid jet; and
      after cutting at least a portion of the core sample, perform a second scan of the cut core sample.

2. The method of claim 1, further comprising causing the core processing apparatus to extract the core sample from a core tube, wherein the cutting occurs during the extracting.

3. The method of claim 1, further comprising causing the core processing apparatus to place at least a portion of the core sample into a carrier.

4. The method of claim 1, wherein the fluid jet comprises a water jet with abrasive.

5. The method of claim 1, further comprising causing the core processing apparatus to calibrate assay results based at least in part upon an analysis of contamination from the fluid jet.

6. The method of claim 1, wherein the fluid jet comprises carbon dioxide in a solid state.

7. The method of claim 1, further comprising causing the core processing apparatus to store resulting scan data in a computer readable storage medium.

8. The method of claim 7, wherein performing the first scan and performing the second scan comprises at least one of:
    imaging the core sample with a camera;
    imaging the core sample with visual light;
    imaging the core sample with ultraviolet light;
    sensing a magnetic field; or
    detecting an X-ray fluorescence.

9. An apparatus comprising:
    a pre-cut scanning assembly configured to perform a first scan of at least a portion of a core sample;
    a fluid cutter configured to cut at least a portion of the core sample;
    a post-cut scanning assembly configured to perform a second scan of at least a portion of the core sample; and
    a carrier configured to hold at least a portion of the core sample during cutting.

10. The apparatus of claim 9, wherein the carrier comprises:
    a base having an exit aperture for fluid exhaust; and
    a removable or moveable top cover having an entrance aperture for a fluid stream from the fluid cutter.

11. The apparatus of claim 9, wherein:
    the post-cut scanning assembly comprises one or more sensors configured to perform the second scan; and
    the second scan includes scanning at least an interior portion of the core sample.

12. The apparatus of claim 11, wherein the pre-cut scanning assembly and the post-cut scanning assembly comprise a single scanning assembly.

13. The apparatus of claim 11, further comprising a computer readable storage device configured to receive and store data from the one or more sensors.

14. The apparatus of claim 9, further comprising a marking assembly configured to place one or more marking indicia on the core sample, the carrier, or both.

15. The apparatus of claim 14, wherein each of the marking indicia correspond to a linear position of the core sample.

16. A method of operating a contiguous system comprising:
    causing the contiguous system to:
        extract a core sample;
        perform a first scan of a first portion of the core sample;
        after scanning the core sample, cut the core sample using a fluid jet; and
        after cutting at least a portion of the core sample, perform a second scan of a second portion of the core sample.

17. The method of claim 16, wherein the second portion of the core sample includes an interior portion of the core sample.

18. The method of claim 16, further comprising causing the contiguous system to package the cut core sample.

19. The method of claim 16, further comprising causing the contiguous system to extract the core sample from a core tube, wherein the extraction moves the core sample along a path of the fluid jet.

20. The method of claim 16, further comprising causing the contiguous system to place one or more marking indicia on the core sample.

* * * * *